(12) United States Patent
Kiyosada et al.

(10) Patent No.: US 7,482,417 B2
(45) Date of Patent: Jan. 27, 2009

(54) PAPERMAKING CHEMICAL, METHOD FOR MANUFACTURING SAME, AND PAPER CONTAINING SAME

(75) Inventors: Toshitsugu Kiyosada, Chiba (JP); Akira Endou, Sendai (JP); Satoru Iwata, Ichihara (JP); Masatomi Ogawa, Chiba (JP)

(73) Assignee: Seiko PMC Corporation, Tokyo (JP)

( * ) Notice: Subject to any disclaimer, the term of this patent is extended or adjusted under 35 U.S.C. 154(b) by 0 days.

(21) Appl. No.: 10/505,346

(22) PCT Filed: Feb. 21, 2003

(86) PCT No.: PCT/JP03/01918

§ 371 (c)(1),
(2), (4) Date: Jul. 20, 2005

(87) PCT Pub. No.: WO03/070796

PCT Pub. Date: Aug. 28, 2003

(65) Prior Publication Data

US 2005/0272889 A1    Dec. 8, 2005

(30) Foreign Application Priority Data

Feb. 22, 2002  (JP) .............................. 2002-047116

(51) Int. Cl.
 *C08F 12/30* (2006.01)
(52) U.S. Cl. ............... 526/287; 526/238.22; 526/307.3; 526/307.8; 526/304; 526/303.1; 428/41.5
(58) Field of Classification Search ............ 526/238.22, 526/307.3, 307.8, 304; 428/41.5
See application file for complete search history.

(56) References Cited

U.S. PATENT DOCUMENTS

| | | | | |
|---|---|---|---|---|
| 3,288,770 | A | * | 11/1966 | Butler .......................... 526/204 |
| 4,334,013 | A | * | 6/1982 | Bergthaller et al. .......... 430/569 |
| 5,115,065 | A | * | 5/1992 | Ogawa et al. ................. 526/304 |
| 5,698,627 | A | * | 12/1997 | Oguni et al. .................. 524/724 |
| 5,756,646 | A | * | 5/1998 | Nasu et al. ................... 528/310 |

FOREIGN PATENT DOCUMENTS

| | | |
|---|---|---|
| JP | 06-199965 | 7/1994 |
| JP | 07-090797 | 4/1995 |
| JP | 07-109692 | 4/1995 |
| JP | 08-067715 | 3/1996 |
| JP | 08-176990 | 7/1996 |
| JP | 08-269891 | 10/1996 |
| JP | 08-283341 | 10/1996 |
| JP | 08-333427 | 12/1996 |
| JP | 09-13297 | 1/1997 |
| JP | 11-217792 | 8/1999 |
| JP | 2000-160499 | 6/2000 |
| JP | 2000160499 A * | 6/2000 |
| JP | 2000-212229 | 8/2000 |
| JP | 2000-273387 | 10/2000 |

* cited by examiner

*Primary Examiner*—Randy Gulakowski
*Assistant Examiner*—Michael M Bernshteyn
(74) *Attorney, Agent, or Firm*—The Webb Law Firm

(57) ABSTRACT

A novel (meth)acrylamide polymer capable of forming a papermaking chemical exhibiting an excellent paper strengthening effect, drainage improvement effect, retention improvement effect, plybond strength enhancing effect, surface strength enhancing effect, and sizing improvement effect in acid, neutral, or alkaline papermaking systems, as well as a method for manufacturing this polymer, and paper that makes use of this polymer and has excellent bursting strength, internal bond strength, and other such properties is provided. This is a (meth)acrylamide polymer produced by polymerizing a monomer (a) expressed by the following general formula 1, the following monomer (b), and the following monomer (c):

(a) general formula 1:

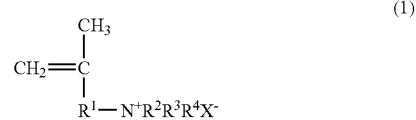

(1)

(b) a (meth)acrylamide;
(c) an ionic monomer other than monomer (a) expressed by general formula 1 above.

14 Claims, No Drawings

PAPERMAKING CHEMICAL, METHOD FOR MANUFACTURING SAME, AND PAPER CONTAINING SAME

BACKGROUND OF THE INVENTION

1. Field of the Invention

This invention relates to a papermaking chemical, a method for manufacturing this papermaking chemical, and paper containing the same, and more particularly relates to a papermaking chemical exhibiting an excellent paper strengthening effect, drainage improvement effect, retention improvement effect, plybond strength enhancing effect, surface strength enhancing effect, and sizing improvement effect in acid, neutral, or alkaline papermaking systems; a method for manufacturing a papermaking chemical containing a (meth)acrylamide polymer, with which this papemiaking chemical can be formed; and paper that makes use of this (meth)acrylamide polymer and as a result has excellent bursting strength, internal bond strength, and other such properties.

2. Background Art

Various kinds of papermaking chemicals have been used in the papermaking process in the past for the purpose of raising productivity through higher machinery speed, or improving the paper quality. (Meth)acrylamide polymers are especially important chemicals in terms of improving paper quality and raising productivity, and as such these chemicals are being used in an increasingly wide range of applications and continue to be improved.

(Meth)acrylamide polymers are widely used as papermaking chemicals having a paper strengthening effect, drainage improvement effect, retention improvement effect, plybond strength enhancing effect, surface strength enhancing effect, sizing improvement effect, and so forth. From the standpoint of their ionicity, (meth)acrylamide polymers are classified into anionic, cationic, and amphoteric polymers. At first, anionic (meth)acrylamide polymers were used along with aluminum sulfate back in the 1960's. Then, in the 1970's and 80's, Mannich-modified (meth)acrylamide polymers, Hofmann-modified (meth)acrylamide polymers, and other such polymers into which cationic groups had been introduced came into use for the purpose of improving drainage and retention. However, aqueous solutions of these modified (meth)acrylamide polymers have poor viscosity stability. Also, a problem with a Mannich-modified (meth)acrylamide polymer aqueous solution is that it contains formalin.

Then, beginning in the 1980's, an amphoteric (meth)acrylamide polymer produced by copolymerizing acrylamide with an anionic vinyl compound and a cationic vinyl compound came into use (see Japanese Laid-Open Patent Application S60-94697, etc.). This amphoteric (meth)acrylamide polymer is used alone or together with an anionic (meth) acrylamide polymer.

Researchers have also improved the polymerization method in an effort to increase the effectiveness of a (meth) acrylamide polymer as a papermaking chemical. Some documents disclose a method for enhancing performance by continuously synthesizing an anionic (meth)acrylamide polymer and a cationic (meth)acrylamide polymer by two-stage dropping polymerization, thereby forming a so-called ion complex (see Japanese Laid-Open Patent Applications H6-199965 and H7-90797, for example). However, obtaining a satisfactory effect with a papermaking chemical containing a conventional (meth)acrylamide polymer has become impossible in recent years because of fluctuation in the pulp slurry pH during papermaking as a result of variance in the quality of the papermaking raw material, or because of increases in the amount of recycled paper being used, that of the admixed impurities due to the fact that the papermaking process has become a more closed system, that of fines, and so forth. Under these circumstances, there is a need for further improvement to papermaking chemicals in order to increase productivity, paper strength, sizing, and so on.

Compounds for obtaining a polymer with good fluidity and dispersibility and low viscosity have also been proposed in an attempt to raise the productivity of (meth)acrylamide polymers and to improve the effectiveness of (meth)acrylamide polymers as papermaking chemicals. These compounds include 2-propanol, hypophosphorous acid, mercaptans, all of which compounds are known chain transfer agents. In addition, 2-propen-1-ol (that is, allyl alcohol), 2-methyl-2-propen-1-ol (that is, methallyl alcohol) (Japanese Laid-Open Patent Application H8-283341), 2-propene-1-sulfonic acid (salt) (that is, allylsulfonic acid (salt)), 2-methyl-2-propene-1-sulfonic acid (salt) (that is, methallylsulfonic acid (salt)) (see Japanese Laid-Open Patent Applications H8-67715, H8-176990, H8-269891, H8-283341, and H8-333427, for example), and 2-methyl-2-propenenitrile (that is, methacrylonitrile) (Japanese Laid-Open Patent Applications 2000-212229 and 2000-273387) are known as monomers having the function of lowering the viscosity of a polymer, but most of these are nonionic or anionic.

Examples of cationic monomers having the function of lowering the viscosity of a polymer include 2-propenylamine (that is, allylamine) and 2-methyl-2-propenylamine (that is, methallylamine), but these alone will not adequately lower the viscosity of a polymer. Therefore they are used together with a chain transfer agent in actual practice. For instance, when 2-propenylamine is used, 2-methyl-2-propene-1-sulfonic acid (salt) is used to lower the viscosity of the polymer (see Japanese Laid-Open Patent Application H11-217792, for example). Conversely, if an attempt is made to lower the viscosity of a polymer with one of the above by itself, the compound has to be used in a large quantity, in which case the problem is that a large amount of unreacted monomer remains behind.

Thus, from the standpoint of the ionicity of a compound having the function of lowering the viscosity of a polymer, none of the options is satisfactory. It has become difficult to achieve the above-mentioned high level of performance as a papermaking chemical and to deal with the increasing demands of papermaking conditions.

There has recently been proposed a method for manufacturing a (meth)acrylamide polymer with low viscosity and good fluidity and dispersibility by polymerizing a monomer aqueous solution whose main component is (meth)acrylamide and which contains 2-methyl-2-propenylamine (that is, methallylamine), an inorganic acid or organic acid salt of 2-methyl-2-propenylamine, or a 2-methyl-2-propenyl ammonium salt obtained by reacting methyl chloride, benzyl chloride, epichlorohydrin, or dimethylsulfuric acid with 2-methyl-2-propenylamine (Japanese Laid-Open Patent Applications H8-283341 and H8-333427), but it has not been known that a cationic monomer such as that defined by general formula 1 of the present invention has the function of lowering the viscosity of a polymer.

It is an object of the present invention to provide a papermaking chemical that makes use of a cationic monomer having the function of lowering the viscosity of a polymer and that has an excellent paper strengthening effect, drainage improvement effect, retention improvement effect, plybond strength enhancing effect, and surface strength enhancing effect, and particularly its sizing improvement effect, as well as paper containing this papermaking chemical, a (meth) acrylamide polymer that is favorable for constituting this papermaking chemical, and a method for manufacturing this (meth)acrylamide polymer.

SUMMARY OF THE INVENTION

As a result of diligent research aimed at solving the above problems, the inventors arrived at the present invention upon discovering that a (meth)acrylamide polymer that can be used as a papermaking chemical with little unreacted monomer can be manufactured by using a tertiary or quaternary methallyl ammonium salt expressed by general formula 1 of the present invention as a monomer having the function of lowering the viscosity of a polymer, and that when a (meth) acrylamide polymer made from a tertiary or quaternary methallyl ammonium salt expressed by the following general formula 1 is used as a papermaking chemical, the resulting papermaking chemical has an excellent paper strengthening effect, drainage improvement effect, retention improvement effect, plybond strength enhancing effect, and surface strength enhancing effect, and particularly its sizing improvement effect.

Specifically, the present invention, which is the means for solving the above problems, provides:

(1) A papermaking chemical, containing (meth)acrylamide polymer produced by polymerizing a monomer (a) expressed by the following general formula 1, the following monomer (b), and the following monomer (c):

(a) General Formula 1

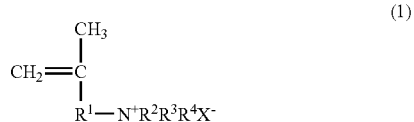

(where $R^1$ is a $C_1$ to $C_4$ alkylene group, $R^2$ to $R^4$ are each a hydrogen atom or $C_{22}$ or lower alkyl group that may have a substituent (two or three of $R^2$ to $R^4$ may not be hydrogen atoms), and $X^-$ is an anion of an inorganic acid or an organic acid);

(b) a (meth)acrylamide;

(c) an ionic monomer other than monomer (a) expressed by general formula 1 above.

(2) A papermaking chemical, containing a (meth)acrylamide polymer, produced by polymenzing a monomer (a) expressed by the following general formula 1, the following monomer (b), the following monomer (c), and a crosslinking agent (d):

(a) General Formula 1

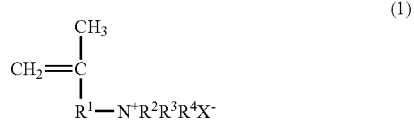

(where $R^1$ is a $C_1$ to $C_4$ alkylene group, $R^2$ to $R^4$ are each a hydrogen atom or $C_{22}$ or lower alkyl group that may have a substituent (two or three of $R_2$ to $R_4$ may not be hydrogen atoms), and X— is an anion of an inorganic acid or an organic acid);

(b) a (meth)acrylamide;

(c) an ionic monomer other than monomer (a) expressed by general formula 1 above.

(3) A method for manufacturing the papermaking chemical containing a (meth)acrylamide polymer according to (1) above, wherein at least one member selected from the group consisting of the monomer (a), monomer (b), and monomer (c) according to (1) above is polymerized, and the remaining monomers are added during this polymerization.

(4) A method for manufacturing the papermaking chemical containing a (meth)acrylamide polymer according to (2) above, wherein at least one member selected from the group consisting of the monomer (a), monomer (b), monomer (c), and crosslinking agent (d) according to (2) above is polymerized, and the remaining monomers are added during this polymerization.

(5) A papermaking chemical, containing a (meth)acrylamide polymer, produced by polymerizing a monomer (a) expressed by the following general formula 1, the following monomer (b), the following monomer (c1), the following monomer (c2), and a crosslinking agent (d):

(a) General Formula 1

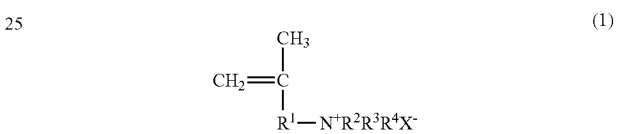

(where $R^1$ is a $C_1$ to $C_4$ alkylene group, $R^2$ to $R^4$ are each a hydrogen atom or $C_{22}$ or lower alkyl group that may have a substituent (two or three of $R^2$ to $R^4$ may not be hydrogen atoms), and X— is an anion of an inorganic acid or an organic acid);

(b) a (meth)acrylamide;

(c1) a (meth)allylsulfonic acid (salt);

(c2) an ionic monomer other than the monomer (a) and the monomer (c1).

(6) A method for manufacturing the papermaking chemical containing a (meth)acrylamide polymer according to (5) above, wherein at least one member selected from the group consisting of the monomer (a), monomer (b), monomer (c1), monomer (c2), and crosslinking agent (d) according to (5) above is polymerized, and the remaining monomers are added during this polymerization.

(7) A papermaking chemical, containing the (meth)acrylamide polymer according to any of (1), (2), and (5) above, produced by the polymerization in the presence of a urea compound (e).

(8) The method for manufacturing a papermaking chemical containing a (meth)acrylamide polymer according to any of (3), (4), and (6) above, wherein the polymerization is conducted in the presence of a urea compound (e).

(9) A papermaking chemical, containing the (meth)acrylamide polymer according to any of (1), (2), (5), and (7) above is a paper strength agent.

(10) Paper containing the papermaking chemical according to (9) above.

DETAILED DESCRIPTION OF THE INVENTION

The monomer (a) used in the present invention is one of the compounds expressed by the following general formula 1. These may be used singly or in combinations of two or more types. Also, these may be used in the form of a powder or a solution.

(a) General Formula 1

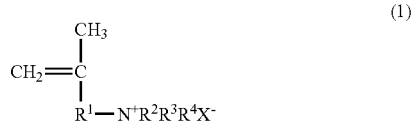

(In the formula, $R^1$ is a $C_1$ to $C_4$ alkylene group, $R^2$ to $R^4$ are each a hydrogen atom or $C_{22}$ or lower alkyl group that may have a substituent (two or three of R to $R^4$ may not be hydrogen atoms), and X– is an anion of an inorganic acid or an organic acid.)

The above-mentioned $R^1$ is a $C_1$ to $C_4$ alkylene group, and more specifically is a methylene group ($-CH_2-$), ethylene group ($-CH_2CH_2-$), propylene group ($-CH_2CH_2CH_2-$), or butylene group ($-CH_2CH_2CH_2CH_2-$), with a methylene group being preferable. The above-mentioned R to $R^4$ are each a hydrogen atom or $C_{22}$ or lower alkyl group that may have a substituent (two or three of $R^2$ to $R^4$ may not be hydrogen atoms). Preferably, these are $C_{22}$ or lower alkyl groups, hydroxyalkyl groups, alkylamine groups, alkyl ether groups, alkyl ester groups, alkylamide groups, aryl groups, or groups that have a cyclic structure when any two of $R^2$ to $R^4$ bond together. More specifically, $R^2$ to $R^4$ are a methyl group, ethyl group, butyl group, stearyl group, hydroxyethyl group, or benzyl group; these may all be the same substituent, or a combination of different substituents. Specific examples of cyclic structures include a morpholine skeleton structure comprising a nitrogen atom, $R^3$, and $R^4$. It is preferable for one, two, or all three of $R^2$ to $R^4$ to be a hydroxyethyl group, with the remaining $R^2$ to $R^4$ being a hydrogen atom or methyl group.

$X^-$ is an anion in an inorganic acid such as hydrochloric acid, hydrobromic acid, sulfuric acid, phosphoric acid, or nitric acid; or an anion in an organic acid, including carboxylic acids such as formic acid, acetic acid, oxalic acid, propionic acid. $X^-$ is preferably $Cl^-$, $Br^-$, or $I^-$, with $Cl^-$ being particularly favorable.

Examples of the monomer (a) expressed by the above-mentioned general formula 1 include 2-propene-1-aminium, N,N,N,2-tetramethyl, chloride; 2-propene-1-aminium, N,N-diethyl-2-methyl, hydrochloride; 2-propene-1-aminium, N,N,N-triethyl-2-methyl, chloride; 2-propene-1-aminium, N,N,N-tributyl-2-methyl, chloride; 2-propene-1-aminium, N,N,2-trimethyl-N-octadecyl, chloride; benzenemethaneaminium, N,N-dimethyl-N-(2-methyl-2-propenyl), chloride; N-methyl-N-(2-methyl-2-propenyl)morpholinium, chloride; 2-propene-1-aminium, N-hydroxyethyl-N,N,2-trimethyl, chloride; 2-propene-1-aminium, N,N-dihydroxyethyl-N,2-dimethyl, chloride; and 2-propene-1-aminium, N-hydroxyethyl-N,2-dimethyl, hydrochloride.

The (meth)acrylamide used as monomer (b) in the present invention is 2-propenamide (that is, acrylamide) or 2-methyl-2-propenamide (that is, methacrylamide). It is preferable for monomer (b) to be 2-propenamide. These can be used in the form of a powder or a solution.

Examples of the ionic monomer other than monomer (a) expressed by general formula 1 used as monomer (c) in the present invention include anionic monomers and cationic monomers, which can be used singly or in combinations of two or more types, and can be variously selected according to the desired properties of the polymer.

Examples of the above-mentioned anionic monomer include carboxyl group-containing monomers (this refers to polymerizable vinyl monomers containing carboxyl groups), sulfonic acid group-containing monomers (this refers to polymerizable vinyl monomers containing sulfonic acid groups), and phosphoric acid group-containing monomers (this refers to polymerizable vinyl monomers containing phosphoric acid groups).

Examples of the above-mentioned carboxyl group-containing monomers include 2-propenoic acid (that is, acrylic acid), 2-methyl-2-propenoic acid (that is, methacrylic acid), trans-3-phenylpropenoic acid (that is, cinnamic acid), trans-2-butenoic acid (that is, crotonic acid), and other such unsaturated monocarboxylic acids; N-(1-carboxylmethylol)-2-propenamide (that is, 2-acrylamide glycolic acid), N-(1-carboxylmethylol)-2-methyl-2-propenamide (that is, 2-methacrylamide glycolic acid), and other such glyoxylic acids; trans-2-butendioic acid (that is, fumaric acid), cis-2-butendioic acid (that is, maleic acid), 2-methylenebutandioic acid (that is, itaconic acid), (Z)-2-methyl-2-butendioic acid (that is, citraconic acid), trans,trans-2,4-hexadiendioic acid (that is, muconic acid), and other such unsaturated dicarboxylic acids; propene-cis-1,2,3-tricarboxylic acid (that is, aconitic acid), 3-butene-1,2,3-tricarboxylic acid, 4-pentene-1,2,4-tricarboxylic acid, and other such unsaturated tricarboxylic acids; and 1-pentene-1,1,4,4-tetracarboxylic acid, 4-pentene-1,2,3,4-tetracarboxylic acid, 3-hexene-1,1,6,6-tetracarboxylic acid, and other such unsaturated tetracarboxylic acids.

Examples of the above-mentioned sulfonic acid group-containing monomers include ethylenesulfonic acid (that is, vinylsulfonic acid), 4-ethylenebenzenesulfonic acid (that is, styrenesulfonic acid), 2-propene-1-sulfonic acid (that is, allylsulfonic acid), 2-methyl-2-propene-1-sulfonic acid (that is, methallylsulfonic acid), and 2-methyl-N-propenoyl-2-aminopropanesulfonic acid (that is, 2-acrylamide-2-methylpropanesulfonic acid).

Examples of the above-mentioned phosphoric acid group-containing monomers include ethylenephosphoric acid (that is, vinylphosphoric acid) and 1-phenylethylenephosphoric acid (that is, 1-phenylvinylphosphoric acid).

Salts of carboxyl group-containing monomers, sulfonic acid group-containing monomers, and phosphoric acid group-containing monomers can also be used. Examples of salts of the above-mentioned carboxyl group-containing monomers, sulfonic acid group-containing monomers, and phosphoric acid group-containing monomers include alkali metal salts, alkaline earth metal salts, and ammonium salts.

These can be used singly or in combinations of two or more types.

Of the above-mentioned anionic monomers, an unsaturated dicarboxylic acid is preferable, and 2-methylenebutandioic acid (that is, itaconic acid) is particularly favorable.

Examples of the above-mentioned cationic monomers include vinyl monomers having primary amino groups, vinyl monomers having secondary amino groups, vinyl monomers having tertiary amino groups, and vinyl monomers having quaternary ammonium salts.

Examples of the above-mentioned vinyl monomers having primary amino groups include 2-propenylamine (that is, allylamine), 2-methyl-2-propenylamine (that is, methallylamine), and salts of these. Examples of salts of these include hydrochlorides, sulfates, and other such inorganic acid salts, and formates, acetates, and other such organic acid salts.

Examples of the above-mentioned vinyl monomers having secondary amino groups include di(2-propenyl)amine (that is, diallylamine), di(2-methyl-2-propenyl)amine (that is, dimethallylamine), and salts of these. Examples of salts of these include hydrochlorides, sulfates, and other such inorganic acid salts, and formates, acetates, and other such organic acid salts.

Examples of the above-mentioned vinyl monomers having secondary amino groups also include monomers that have been made into an acid salt of a secondary amine by a reaction between one of the above-mentioned vinyl monomers having primary amino groups, such as 2-propenylamine (that is, allylamine) or 2-methyl-2-propenylamine (that is, methallylamine), and an alkyl halide (such as methyl chloride or methyl bromide), an aralkyl halide (such as benzyl chloride or benzyl bromide), a dialkylsulfuric acid (such as dimethylsulfuric acid or diethylsulfuric acid), epichlorohydrin, or the like.

Examples of the above-mentioned vinyl monomers having tertiary amino groups include N,N-dimethyl-2-propenoyloxyethylamine (that is, dimethylaminoethyl acrylate), N,N-dimethyl-2-(2-methyl propanoyl-oxy)ethylamine (that is, dimethylaminoethyl methacrylate), N,N-diethyl-2-propenoyloxyethylamine (that is, diethylaminoethyl acrylate), N,N-diethyl-2-(2-methylpropenoyloxy)ethylamine (that is, diethylaminoethyl methacrylate), N,N-dimethyl-3-propenoyloxypropylamine (that is, dimethylaminopropyl acrylate), N,N-dimethyl-3-(2-methylpropenoyloxy)propylamine (that is, dimethylaminopropyl methacrylate), N,N-diethyl-3-propenoyloxypropylamine (that is, diethylaminopropyl acrylate), N,N-diethyl-3-(2-methylpropenoyloxy) propylamine (that is, diethylaminopropyl methacrylate), and other such dialkylaminoalkyl (meth)acrylates; N,N-dimethyl-3-propenoylaminopropylamine (that is, dimethylaminopropyl acrylamide), N,N-dimethyl-3-(2-methylpropenoylamino)-propylamine (that is, dimethylaminopropyl methacrylamide), N,N-diethyl-3-propenoylaminopropylamine (that is, diethylaminopropyl acrylamide), N,N-diethyl-3-(2-methylpropenoylamino) propylamine (that is, diethylaminopropyl methacrylamide), and other such dialkylaminoalkyl (meth) acrylamides; and salts of these. Examples of salts of these compounds include hydrochlorides, sulfates, and other such inorganic acid salts, and formates, acetates, and other such organic acid salts.

Examples of the above-mentioned vinyl monomers having tertiary amino groups also include monomers that have been made into an acid salt of a tertiary amine by a reaction between one of the above-mentioned vinyl monomers having secondary amino groups, such as di(2-propenyl)amine (that is, diallylamine) or di(2-methyl-2-propenyl)amine (that is, dimethallylamine), and an alkyl halide (such as methyl chloride or methyl bromide etc.), an aralkyl halide (such as benzyl chloride or benzyl bromide etc.), a dialkylsulfuric acid (such as dimethylsulfuric acid or diethylsulfuric acid etc.), epichlorohydrin, or the like.

Examples of vinyl monomers having quaternary ammonium salts include N,N-dimethyl-N,N-di(2-propenyl)ammonium chloride (that is, diallyldimethylammonium chloride), N,N-dimethyl-N,N-di(2-methyl-2-propenyl)ammonium chloride (that is, dimethallyldimethylammonium chloride), N,N-diethyl-N,N-di(2-propenyl)ammonium chloride (that is, diallyldiethylammonium chloride), and N,N-diethyl-N,N-di(2-methyl-2-propenyl)ammonium chloride (that is, diethyldimethallylammonium chloride).

Another example of a vinyl monomer having a quaternary ammonium salt includes a vinyl monomer obtained by reacting one of the above-mentioned vinyl monomers having tertiary groups with a quaternizing agent. Examples of quaternizing agents include alkyl halides such as methyl chloride or methyl bromide, aralkyl halides such as benzyl chloride or benzyl bromide, alkylsulfuric acids such as dimethylsulfuric acid or diethylsulfuric acid, epichlorohydrin, 3-chloro-2-hydroxypropyltrimethyl-ammonium chloride, and glycidyltrialkylammonium chloride. Specific examples include N,N,N-trimethyl-2-[(1-oxo-2-propenyl)oxy]ethaneaminium chloride (that is, acryloyloxyethyltrimethylammonium chloride), N,N,N-trimethyl-2-[(2-methyl-1-oxo-2-propenyl)oxy]ethaneaminium chloride (that is, methacryloyloxyethyltrimethylammonium chloride), N,N-dimethyl-N-[2[(1-oxo-2-propenyl)oxy]ethyl]benzenemethaneaminium chloride (that is, acryloyloxyethyldimethylbenzylammonium chloride), N,N-dimethyl-N-[2[(2-methyl-1-oxo-2-propenyl)oxy]ethyl]benzenemethaneaminium chloride (that is, methacryloyloxyethyldimethylbenzylammonium chloride), N,N-dimethyl-N-[2[(1-oxo-2-propenyl)oxy]propyl] benzenemethaneaminium chloride (that is, acryloyloxypropyldimethylbenzylammonium chloride), and N,N-dimethyl-N-[2[(2-methyl-1-oxo-2-propenyl)oxy]propyl]benzenemethaneaminium chloride (that is, methacryloyloxypropyl dimethylbenzylammonium chloride).

These vinyl monomers having primary amino groups, secondary amino groups, tertiary amino groups, or quaternary ammonium salts may be used singly or in combinations of two or more types.

The (meth)allylsulfonic acid (salt) used as monomer (c1) in the present invention is 2-propene-1-sulfonic (that is, allylsulfonic acid), 2-methyl-2-propene-1-sulfonic acid (that is, methallylsulfonic acid), or an alkali metal salt, alkaline earth metal salt, or ammonium salt of one of these sulfonic acid monomers. The monomer (c1) is preferably a sodium salt of 2-methyl-2-propene-1-sulfonic acid. These may be used in the form of a powder or a solution.

Examples of the crosslinking agent (d) used in the present invention include difunctional monomers such as di(meth) acrylates, bis(meth)acrylamides, and divinyl esters having unsaturated bonds, monomers that exhibit a crosslinking action by having chain transfer points and vinyl groups; and monomers that exhibit a crosslinking action by having vinyl groups and reactive groups; and polyfunctional vinyl monomers such as trifunctional vinyl monomers, tetrafunctional vinyl monomers. The term "crosslinking agent (d)" is used in the present invention, but this crosslinking agent (d) is also a polymerizable monomer. In addition to the above, examples of the crosslinking agent (d) include water-soluble aziridinyl compounds, water-soluble polyfunctional epoxy compounds, and silicon compounds. These can be used singly or in combinations of two or more types.

Examples of the above-mentioned di(meth)acrylates include 1,2-di(propenoyloxy)ethane (that is, ethylene glycol diacrylate), 1,2-di(2-methylpropenoyloxy)ethane (that is, ethylene glycol dimethacrylate), 1-propenoyloxy-2-(2-propenoyloxyethoxy)ethane (that is, diethylene glycol diacrylate), 1-(2-methylpropenoyloxy)-2-(2-(2-methylpropenoyloxy)ethoxy)ethane (that is, diethylene glycol dimethacrylate), 1,2-di(propenoyloxyethoxy)ethane (that is, triethylene glycol diacrylate), 1,2-di(2-(2-methylpropenoyloxy)ethoxy)ethane (that is, triethylene glycol dimethacrylate), 1,2-di(propenoyloxy)propane (that is, propylene glycol diacrylate), 1,2-di(2-methylpropenoyloxy-2-methylpropenoyloxy)propane (that is, propylene glycol dimethacrylate), 1,2-dipropenoyloxy-3-propanol (that is, glycerol diacrylate), 1,3-dipropenoyloxy-2-propanol (that is, glycerol diacrylate), 1,2-di(2-methylpropenoyloxy)-3-propanol (that is, glycerol dimethacrylate), and 1,3-di(2-methylpropenoyloxy)-2-propanol (that is, glycerol dimethacrylate). These can be used singly or in combinations of two or more types.

Examples of the above-mentioned bis(meth)acrylamides include di(propenoylamino)methane (that is, N,N-methylene-bisacrylamide), di(2-methylpropenoylamino)methane (that is, N,N-methylenebismethacrylamide), 1,2-di(propenoylamino)ethane (that is, ethylenebisacrylamide), 1,2-di(2-methylpropenoylamino)ethane (that is, ethylenebismethacrylamide), 1,6-di(propenoylamino)hexane (that is, hexamethylenebisacrylamide), 1,6-di(2-methylpropenoylamino)hexane (that is, hexamethylenebismethacrylamide), di(propenoylamino)ethanoic acid (that is, N,N-bisacrylamidoacetic acid), di(propenoylamino)ethanoyloxymethane (that is, methyl N,N-bisacrylamidoacetate), (di(propenoylamino)methyl)benzene (that is, N,N-benzylidenebisacrylamide), and N,N-bis(propanoylaminomethyl)carbonyldiamide (that is, N,N-bis(acrylamidemethylene)urea). These can be used singly or in combinations of two or more types.

Examples of the above-mentioned divinyl esters include diethynyl hexanedionate (that is, divinyl adipate), diethynyl decanedionate (that is, divinyl sebacate), di(2-propenyl)-trans-2-butenedioate (that is, diallyl phthalate), di-(2-propenyl)-cis-2-butenedioate (that is, diallyl maleate), and di-(2-propenyl) butanedioate (that is, diallyl succinate). These can be used singly or in combinations of two or more types.

Examples of difunctional monomers other than those listed above include (2-propenyl) propenate (that is, allyl acrylate), 2-methyl-(2-propenyl) propenate (that is, allyl methacrylate), 1,4-diethynylbenzene (that is, divinylbenzene), and 1,4-di(2-methyl-ethynyl)benzene (that is, diisopropenylbenzene). These can be used singly or in combinations of two or more types.

Examples of the above-mentioned monomers that exhibit a crosslinking action by having chain transfer points and vinyl groups include N,N-dimethyl-2-propenamide (that is, N,N-dimethylmethacrylamide), N,N-dimethyl-2-methyl-2-propenamide (that is, N,N-dimethylmethacrylamide), N,N-diethyl-2-propenamide (that is, N,N-diethylmethacrylamide), and N,N-diethyl-2-methyl-2-propenamide (that is, N,N-diethylmethacrylamide). These can be used singly or in combinations of two or more types.

Examples of the above-mentioned monomers that exhibit a crosslinking action by having vinyl groups and reactive groups include N-methylol-2-propenamide (that is, N-methylolacrylamide), (1,2-epoxypropyl) propenate (that is, glycidyl acrylate), and (1,2-epoxypropyl) 2-methylpropenate (that is, glycidyl methacrylate). These can be used singly or in combinations of two or more types.

Examples of the above-mentioned trifunctional vinyl monomers include tri(propeloyloxy)methane (that is, triacrylformal), tri(2-propenyl)-1,3,5-triazin-2,4,6 (1H,3H,5H)-trione (that is, triallyl isocyanate), N,N-di(2-propenyl)-2-propenamide (that is, N,N-diallylacrylamide), N,N-di(2-propenyl)-2-methyl-2-propenamide (that is, N,N-diallylmethacrylamide), tri(2-propenyl)amine (that is, triallylamine), and tri(2-propenyl) 1,2,4-benzenetricarboxylate (that is, triallyl trimellitate). These can be used singly or in combinations of two or more types.

Examples of the above-mentioned tetrafunctional vinyl monomers include 1,3-di(propeloyloxy)-2,2-di(propeloyloxymethyl)propane (that is, tetramethylolmethane tetraacrylate), tetra(2-propenyl) 1,2,4,5-benzenetetracarboxylate (that is, tetrallyl pryomellitate), N,N,N',N'-tetra(2-propenyl)-1,4-diaminobutane (that is, N,N,N',N'-tetraallyl-1,4-diaminobutane), tetra(2-propenyl)amine (salt) (that is, tetraallylamine (salt)), and 1,1,2,2-tetra(propenyl) oxyethane (that is, tetraallyloxyethane). These can be used singly or in combinations of two or more types.

Examples of the above-mentioned water-soluble aziridinyl compounds include tetramethylolmethane-tri-β-aziridinyl propionate, trimethylolpropane-tri-β-aziridinyl propionate, and 4,4'-bis(ethyleneiminecarbonylamino)diphenylmethane. These can be used singly or in combinations of two or more types.

Examples of the above-mentioned water-soluble polyfunctional epoxy compounds include (poly)ethylene glycol diglycidyl ether, (poly)propylene glycol diglycidyl ether, (poly)glycerol diglycidyl ether, and (poly)glycerol triglycidyl ether. These can be used singly or in combinations of two or more types.

Examples of the above-mentioned silicon compounds include 3-(propenoyloxy)methyltrimethoxysilane (that is, 3-acryloyloxymethyltrimethoxysilane), 3-(2-methylpropenoyloxy)methyltrimethoxysilane (that is, 3-methacryloyloxymethyltrimethoxysilane), 3-(propenoyloxy)propyldimethoxymethylsilane (that is, 3-acryloyloxypropyldimethoxymethylsilane), 3-(2-methylpropenoyloxy)propyldimethoxymethylsilane (that is, 3-methacryloyloxypropyldimethoxymethylsilane), 3-(propenoyloxy)propyltrimethoxysilane (that is, 3-acryloyloxypropyltrimethoxysilane), 3-(2-methylpropenoyloxy)propyltrimethoxysilane (that is, 3-methacryloyloxypropyltrimethoxysilane), 3-(propenoyloxy)propylmethyldichlorosilane (that is, 3-acryloyloxypropylmethyldichlorosilane), 3-(2-methylpropenoyloxy)propylmethyldichlorosilane (that is, 3-methacryloyloxypropylmethyldichlorosilane), 3-(propenoyloxy)octadecyltriacetoxysilane (that is, 3-acryloyloxyoctadecyltriacetoxysilane), 3-(2-methylpropenoyloxy)octadecyltriacetoxysilane (that is, 3-methacryloyloxyoctadecyltriacetoxysilane), 3-(propenoyloxy)-2,5-dimethylhexyldiacetoxymethylsilane (that is, 3-acryloyloxy-2,5-dimethylhexyldiacetoxymethylsilane), 3-(2-methylpropeloyloxy)-2,5-dimethylhexyldiacetoxymethylsilane (that is, 3-methacryloyloxy-2,5-dimethylhexyldiacetoxymethylsilane) and vinyldimethylacetoxysilane. These can be used singly or in combinations of two or more types.

In the present invention, a monomer (sometimes referred to as "monomer (f)") other than the above-mentioned monomer (a), monomer (b), monomer (c), and crosslinking agent (d) can also be used in the polymerization. Examples of this monomer (f) include nonionic vinyl monomers. Examples of nonionic vinyl monomers include N-substituted-propenamide (that is, N-substituted-acrylamide), N-substituted-2-methylpropenamide (that is, N-substituted-methacrylamide), propenoyloxyalkyl (that is, acrylic ester), 2-methylpropenoyloxyalkyl (that is, methacrylic ester), propenoyloxyhydroxyalkyl (that is, acrylic hydroxyalkyl ester), 2-methylpropenoyloxyhydroxyalkyl (that is, methacrylic hydroxyalkyl ester), 2-propenenitrile (that is, acrylonitrile), 2-methyl-2-propenenitrile (that is, methacrylonitrile), 1-phenylethylene (that is, styrene), styrene derivatives, 1-acetoxyethylene (that is, vinyl acetate), 1-propioxyethylene (that is, vinyl propionate), and 1-methoxyethylene (that is, methyl vinyl ether). These can be used singly or in combinations of two or more types.

Examples of the various types of the above-mentioned N-substituted-propenamide (that is, N-substituted-acrylamide), N-substituted-2-methyl-propenamide (that is, N-substituted-methacrylamide) include N-methylpropenamide (that is, N-methylacrylamide), N-methyl-2-methylpropenamide (that is, N-methylmethacrylamide), N-ethylpropenamide (that is, N-ethylacrylamide), N-ethyl-2-methylpropenamide (that is, N-ethylmethacrylamide), N-(2-propyl) propenamide (that is, N-isopropylacrylamide), N-(2-propyl)-2-methylpropenamide (that is, N-isopropylmethacrylamide), N-(t-octyl)propenamide (that is, N-t-octylacrylamide), and N-(t-octyl)-2-methylpropenamide (that is, N-t-octyl-methacrylamide).

Examples of the urea compound (e) used in the present invention include, for example, urea, thiourea, ethyleneurea, ethylenethiourea and phosphates and sulfates of guanidyl urea. These can be used singly or in combinations of two or more types. Of these, urea is preferable. Some of the urea compound may be added during or after the polymerization. The entire amount of the urea compound may also be added upon completion of the polymerization, but from the standpoint of the performance of the papermaking chemical, it is preferable to add the compound prior to the start of polymerization.

The amounts in which the above-mentioned monomer (a), monomer (b), monomer (c) (specifically, monomer (c1) and monomer (c2)), and crosslinking agent (d) are blended in the (meth)acrylamide polymer pertaining to the present invention can be determined by taking into account the performance, such as the internal bond strength, bursting strength, and other aspects of paper strength, or drainage during papermaking, or the retention of filler or fine, when the resulting papermaking chemical containing the (meth)acrylamide polymer is used in the manufacture of paper.

In terms of the properties of the papermaking chemical and (meth)acrylamide polymer pertaining to the present invention, when the above-mentioned monomer (a), monomer (b), and monomer (c) are used, monomer (a) is usually used in an amount of 0.01 to 5 mol %, and preferably 0.01 to 2 mol %, monomer (b) is usually used in an amount of 55 to 99.89 mol %, and preferably 78 to 98.99 mol %, and monomer (c) is usually used in an amount of 0.1 to 40 mol %, and preferably 1 to 20 mol %, with respect to the combined 100 mol % of the monomer (a), monomer (b), and monomer (c). The ratio of anionic monomers to cationic monomers can be selected in view of the desired performance of the papermaking chemical. The above-mentioned monomer (f), which can be copolymerized with the above-mentioned monomer (a), monomer (b), and monomer (c), can be used in an amount of 5 mol % or less.

When the above-mentioned monomer (a), monomer (b), monomer (c), and crosslinking agent (d) are used, monomer (a) is usually used in an amount of 0.01 to 5 mol %, and preferably 0.01 to 2 mol %, monomer (b) is usually used in an amount of 52 to 99.889 mol %, and preferably 77 to 98.985 mol %, and monomer (c) is usually used in an amount of 0.1 to 40 mol %, and preferably 1 to 20 mol %, with respect to the combined 100 mol % of the monomer (a), monomer (b), monomer (c), and crosslinking agent (d). The ratio of anionic monomers to cationic monomers can be selected in view of the desired performance of the papermaking chemical. The crosslinking agent (d) is usually used in an amount of 0.001 to 3 mol %, and preferably 0.005 to 1 mol %. The above-mentioned monomer (f), which can be copolymerized with the above-mentioned monomer (a), monomer (b), monomer (c), and crosslinking agent (d), can be used in an amount of 5 mol % or less.

When the above-mentioned monomer (a), monomer (b), monomer (c1), monomer (c2), and crosslinking agent (d) are used, monomer (a) is usually used in an amount of 0.01 to 5 mol %, and preferably 0.01 to 2 mol %, monomer (b) is usually used in an amount of 52 to 99.889 mol %, and preferably 77 to 98.985 mol %, monomer (c1) is usually used in an amount of 0.01 to 2 mol %, and preferably 0.01 to 1 mol %, and monomer (c2) is usually used in an amount of 0.09 to 38 mol %, and preferably 0.99 to 19 mol %, with respect to the combined 100 mol % of the monomer (a), monomer (b), monomer (c1), monomer (c2), and crosslinking agent (d). The ratio of anionic monomers to cationic monomers can be selected in view of the desired performance of the papermaking chemical. The crosslinking agent (d) is usually used in an amount of 0.001 to 3 mol %, and preferably 0.005 to 1 mol %. The above-mentioned monomer (f), which can be copolymerized with the above-mentioned monomer (a), monomer (b), monomer (c1), monomer (c2), and crosslinking agent (d), can be used in an amount of 5 mol % or less.

The amount in which the above-mentioned urea compound (e) is added is preferable 50 wt % or less (as solids), and even more preferably 30 wt % or less, with respect to the total monomer weight. A (meth)acrylamide polymer with even better paper strengthening and other such effects can be synthesized by conducting the polymerization of the present invention in the presence of a urea compound. Adding this urea compound also has the advantage of increasing the viscosity stability of the papermaking chemical.

Any known polymerization method can be employed in conducting the polymerization in the present invention. When a polymerization initiator is used in this polymerization, any polymerization initiator known in the past can be used. Specifically, sodium persulfate, potassium persulfate, ammonium persulfate, and other such persulfates; benzoyl peroxide, hydrogen peroxide, tert-butyl hydroperoxide, di-tert-butyl peroxide, and other such peroxides; sodium bromate, potassium bromate, and other such bromates; sodium perborate, ammonium perborate, and other such perborates; sodium percarbonate, potassium percarbonate, ammonium percarbonate, and other such percarbonates; and sodium perphosphate, potassium perphosphate, ammonium perphosphate, and other such perphosphates can be used. These can be used singly or in combinations of two or more types. Also, a reducing agent can be used as a redox polymerization agent. Examples of the above-mentioned reducing agent include sodium sulfite and other such sulfites; sodium hydrogensulfite and other such hydrogensulfites; sodium metabisulfite and other such metabisulfites; N,N,N',N'-tetramethylethylenediamine and other such organic amines, and aldose and other such reducing sugars. These reducing agents can be used singly or in combinations of two or more types. In addition to the above, azobisisobutyronitrile, 2,2'-azobis-(2-amidinopropane) dihydrochloride, 2,2'-azobis-(2,4'-dimethylvaleronitrile), 1,1-azobis-(cyclohexane-1-carbonitrile), 2,2'-azobis-[2-methyl-N-(2-hydroxyethyl)propionamide], 4,4'-azobis-(4-cyanopentionic acid) (that is, 4,4'-azobis-(4-cyanovaleric acid)), salts thereof, and other such azo-type polymerization initiators can be used. Usually, the polymerization initiator is added to the monomer solution to initiate the polymerization. However, part of the polymerization initiator may be added during the polymerization for the purpose of reducing the amount of unreacted monomer. A method in which the solution is irradiated with radiation, an electron beam, or ultraviolet rays can also be used. These methods can be used singly or in combinations of two or more.

If needed, a conventional chain transfer agent can also be used in the polymerization of the present invention.

Examples of conventional chain transfer agents include compounds having one or more hydroxyl groups in their molecule, compounds having one or more mercapto groups in their molecule, and compounds having one or more carbon-carbon unsaturated bonds in their molecule.

Examples of compounds having one or more hydroxyl groups in their molecule include ethanol, 2-propanol, butanol, ethylene glycol, glycerol, and other such alcohols;

polyethylene oxide, polyglycerol, and other such oligomers and polymers; and glucose, ascorbic acid, sucrose, and other such sugars and vitamins.

Examples of compounds having one or more mercapto groups in their molecule include butyl mercaptan, mercaptoethanol, thioglycolic acid, thioglycolic acid alkyl esters, mercaptopropionic acid, mercaptopropionic acid alkyl esters, thioglycerol, cysteamine, and salts thereof.

Examples of compounds having one or more carbon-carbon unsaturated bonds in their molecule include 2-propenol (that is, allyl alcohol), 2-methyl-2-propenol (that is, methallyl alcohol), ester derivatives of these compounds, 2-propenyl halide (that is, allyl halide), 2-methyl-2-propenyl halide (that is, methallyl halide), 3-butenic acid (that is, allylcarboxylic acid), 3-methyl-3-butenic acid (that is, methallylcarboxylic acid), ester derivatives of these compounds, 2-propenyl sulfides (that is, allyl sulfides), 2-methyl-2-propenyl sulfides (that is, methallyl sulfides), 2-propenyl mercaptans (that is, allyl mercaptans), and 2-methyl-2-propenyl mercaptans (that is, methallyl mercaptans).

Other examples of conventional chain transfer agents include dibutyl peroxide and other such peroxides, and hypophosphous acid.

The synthesis of the (meth)acrylamide polymer of the present invention is usually carried out by the following steps (i), (ii), and (iii).

(i) When the polymerization is conducted all at once: The monomers, water (a solvent; an organic solvent may also be used along with the water), and the above-mentioned chain transfer agent (if needed) are supplied to a specific reaction vessel under a nitrogen or other inert gas atmosphere. The above-mentioned polymerization initiator is added under stirring to initiate polymerization, which yields the (meth)acrylamide polymer of the present invention.

(ii) When the polymerization is conducted by multistage addition: First the monomers are divided up into monomers (A) and monomers (B). Monomers (A), water (a solvent; an organic solvent may also be used along with the water), and the above-mentioned chain transfer agent (if needed) are supplied to a specific reaction vessel under a nitrogen or other inert gas atmosphere. The above-mentioned polymerization initiator is added under stirring to initiate polymerization. The relationship between these monomers (A) and (B) and the monomer (a), monomer (b), monomer (c), and crosslinking agent (d) of the present invention will be discussed below. Next, monomers (B) are added immediately after the start of the polymerization of the above-mentioned monomers (A), or during this polymerization, or upon completion of the polymerization. The system is further heated and polymerized after the addition of monomers (B), which yields the (meth) acrylamide polymer of the present invention. The monomers (B) here may be added all at once, or the components of monomers (B) may be divided up and added in stages, or monomers (B) may be added in the form of an aqueous solution (an organic solvent may be used along with the water). The monomers (B) may be added dropwise if in the form of a liquid or an aqueous solution (an organic solvent may be used along with the water).

(iii) Dropping polymerization: Water (a solvent; an organic solvent may also be used along with the water) and the above-mentioned chain transfer agent (if needed) are supplied to a specific reaction vessel under a nitrogen or other inert gas atmosphere. A solution of the monomers, water (a solvent; an organic solvent may also be used along with the water), and the above-mentioned chain transfer agent (if needed) is added dropwise under stirring, and the above-mentioned polymerization initiator is added at the same time to initiate polymerization. Upon completion of the dropping, the system is further heated as necessary, and the resulting polymerization yields the (meth)acrylamide polymer of the present invention.

The polymerization method can consist of putting all of the monomers into the reaction vessel and polymerizing the entire amount all at once, as is usually done, or all of the monomers can be added dropwise to the reaction vessel and polymerized, but it is preferable for the monomers comprising the monomer (a), monomer (b), monomer (c), and crosslinking agent (d) of the present invention to be divided up into monomers (A) and monomers (B) and added in two stages. In this case, the monomers polymerized at the initial stage are termed monomers (A), while the remaining monomers added during the polymerization are termed monomers (B).

In the method for manufacturing a papermaking chemical containing a (meth)acrylamide polymer pertaining to the present invention that is characterized in that at least one member selected from the group consisting of the above-mentioned monomer (a), monomer (b), and monomer (c) is polymerized, and the remaining monomers are added during the polymerization, from the standpoint of the properties of the papermaking chemical and the (meth)acrylamide polymer, monomers (A) may be monomers containing at least one component out of the various components of the above-mentioned monomer (a), monomer (b), and monomer (c), but it is particularly favorable for them to be monomers containing components of each of the above-mentioned monomer (a), monomer (b), and monomer (c). Monomers (B) may be monomers containing at least one component out of the various components of the above-mentioned monomer (a), monomer (b), and monomer (c), but it is particularly favorable for them to be monomers containing just the above-mentioned monomer (c) component, or a monomer containing components of each of the above-mentioned monomer (a), monomer (b), and monomer (c).

In the method for manufacturing a (meth)acrylamide polymer pertaining to the present invention that is characterized in that at least one member selected from the group consisting of the above-mentioned monomer (a), monomer (b), monomer (c), and crosslinking agent (d) is polymerized, and the remaining monomers are added during the polymerization, from the standpoint of the properties of the papermaking chemical and the (meth)acrylamide polymer, monomers (A) may be monomers containing at least one component out of the various components of the above-mentioned monomer (a), monomer (b), monomer (c), and crosslinking agent (d), but it is particularly favorable for them to be monomers containing components of each of the above-mentioned monomer (a), monomer (b), monomer (c), and crosslinking agent (d). Monomers (B) may be monomers containing at least one component out of the various components of the above-mentioned monomer (a), monomer (b), monomer (c), and crosslinking agent (d), but it is particularly favorable for it to be a monomer containing just the above-mentioned monomer (c) component, or a monomer containing components of each of the above-mentioned monomer (a), monomer (b), and monomer (c), or a monomer containing components of each of the above-mentioned monomer (a), monomer (b), monomer (c), and crosslinking agent (d).

In the method for manufacturing a (meth)acrylamide polymer pertaining to the present invention that is characterized in that at least one member selected from the group consisting of the above-mentioned monomer (a), monomer (b), monomer (c1), monomer (c2), and crosslinking agent (d) is polymerized, and the remaining monomers are added during the polymerization, from the standpoint of the properties of the papermaking chemical and the (meth)acrylamide polymer, monomers (A) may contain at least one component out of the various components of the above-mentioned monomer (a), monomer (b), monomer (c1), monomer (c2), and crosslinking agent (d), and monomers (B) may contain at least one component out of the various components of the above-mentioned monomer (a), monomer (b), monomer (c1), monomer (c2), and crosslinking agent (d).

It is particularly favorable to employ a combination of monomers (A), consisting of components of each of the above-mentioned monomer (a), monomer (b), monomer (c1), monomer (c2), and crosslinking agent (d), and monomers (B), consisting of a set of monomers selected from the group consisting of monomers containing just the above-mentioned monomer (c2); monomers containing components of each of the above-mentioned monomer (a), monomer (b), and monomer (c2); monomers containing components of each of the above-mentioned monomer (a), monomer (b), monomer (c1), and monomer (c2); and monomers containing components of each other above-mentioned monomer (a), monomer (b), monomer (c1), monomer (c2), and crosslinking agent (d), or a combination of monomers (A), consisting of components of each of the above-mentioned monomer (a), monomer (b), monomer (c2), and crosslinking agent (d), and monomers (B), consisting of a set of monomers selected from the group consisting of monomers containing components of each of the above-mentioned monomer (c1) and monomer (c2); monomers containing components of each of the above-mentioned monomer (b), monomer (c1), and monomer (c2); and monomers containing components of each other above-mentioned monomer (b), monomer (c1), monomer (c2), and crosslinking agent (d), or a combination of monomers (A), consisting of components of each of the above-mentioned monomer (b), monomer (c1), monomer (c2), and crosslinking agent (d), and monomers (B), consisting of a set of monomers selected from the group consisting of monomers containing components of each of the above-mentioned monomer (a) and monomer (c2); monomers containing components of each of the above-mentioned monomer (a), monomer (b), and monomer (c2); and monomers containing components of each other above-mentioned monomer (a), monomer (b), monomer (c2), and crosslinking agent (d).

The amount in which monomers (B) are added with respect to the combined 100 mol % of monomers (A) and monomers (B) is usually 0.1 to 40 mol %, and preferably 1 to 20 mol %, if monomers (B) do not include monomer (b), and is usually 10 to 70 mol %, and preferably 20 to 60 mol %, if monomers (B) include monomer (b). The components of monomers (B) may be added all at once, or may be divided up and added successively over multiple stages. If the monomers (B) consist of two or more monomer components, they may be added as a mixture of two or more monomers, or the individual monomers of the monomers (B) may be added separately. The monomers (B) may be added dropwise if in the form of a liquid or an aqueous solution (an organic solvent may be used along with the water).

When the monomers (B) are added dropwise, the dropping usually lasts for 5 to 60 minutes, and preferably 10 to 30 minutes. If the monomers (B) consist of two or more monomer components, they may be added as a mixture of two or more monomers, or the individual monomers may be added separately.

There are no particular restrictions on the polymerization temperature as long as it is within a range in which ordinary radical polymerization will occur, but the range is usually from 50 to 95° C.

A chelating agent may be added to the (meth)acrylamide polymer of the present invention during or after polymerization. A variety of chelating agents coordinated to metal ions can be used, but with the present invention it is preferable to use one or more types selected from among citric acid, malic acid, tartaric acid, lactic acid, and so on. Citric acid is particularly favorable.

To the extent that the object of the present invention is not compromised, the polymerization in the present invention can be conducted in the presence of a water-soluble polymer. Examples of water-soluble polymers include starches, polyvinyl alcohols, celluloses, and gums.

The above polymerization operation yields a polymerization solution containing a (meth)acrylamide polymer. The solids concentration of the (meth)acrylamide polymer in this polymerization solution is usually 5 to 35 wt %. The viscosity of the polymerization solution as measured at 25° C. with a Brookfield rotary viscometer is usually no more than 100,000 mPa·s, and preferably no more than 20,000 mPa·s. The above-mentioned polymerization solution is utilized to form the papermaking chemical pertaining to the present invention.

It is unclear why a papermaking chemical containing the (meth)acrylamide polymer manufactured according to the present invention exhibits a paper strengthening effect, drainage improvement effect, retention improvement effect, plybond strength enhancing effect, surface strength enhancing effect, and particularly sizing improvement effect that are superior to those of papermaking chemicals containing (meth)acrylamide polymers manufactured from conventional compositions, but the reason is surmised to be as follows. First, it is believed that the result of using the cationic monomer expressed by general formula 1, which has the function of lowering the viscosity of the polymer, and being able to dispose a cation at a polymer terminal with a high degree of freedom, is that there is enhanced interaction between the pulp (which is anionic) and the above-mentioned (meth)acrylamide polymer. Second, it is believed that since it is possible to use a cationic monomer and an anionic monomer together as monomers having the function of lowering the viscosity of the polymer, the ion balance is optimized better than in the past. Third, it is believed that because cationic and anionic properties can be provided at the polymer terminals having the highest degree of freedom of movement in the macromolecular chain, an ion complex that is even stronger than in the past is formed.

In the manufacture of paper, a papermaking chemical containing a (meth)acrylamide polymer manufactured according to the present invention can be used as an internally added paper strengthener, drainage improver, retention improver, or sizing auxiliary that exhibits a paper strengthening effect, drainage improvement effect, retention improvement effect, or sizing improvement effect when added to a pulp slurry, as a plybond strength enhancer that exhibits an plybond strength enhancing effect on multiply board when applied by spraying or another such method to the wet paper surface immediately after the production of multiply board but before combination, as an externally added paper strengthener that exhibits a paper strengthening effect when applied to a paper surface, and so on.

When a polymerization solution containing a (meth)acrylamide polymer manufactured according to the present invention is used as a papermaking chemical, either directly or after being diluted with water (may also contain an organic solvent), for example, the raw material pulp can be kraft pulp, sulfite pulp, or other such bleached or unbleached chemical pulp; groundwood pulp, mechanical pulp, thermomechanical pulp, or other such bleached or unbleached high yield pulp; or newsprint, magazine paper, cardboard, deinked paper, or other such used paper pulp. Mixtures of the above-mentioned pulps and asbestos, polyamide, polyester, polyolefin, and the like can also be used for the raw material pulp.

When the papermaking chemical of the present invention is used as an internally added paper strengthener, a papermaking chemical containing the above-mentioned (meth)acrylamide polymer synthesized according to the present invention may be used alone, or this papermaking chemical may be used together with an anionic (meth)acrylamide polymer, a Mannich-modified (meth)acrylamide polymer, a Hofmann-modified (meth)acrylamide polymer, aluminum sulfate, or the like.

When a papermaking chemical containing a (meth)acrylamide polymer manufactured according to the present invention is used as an internally added papermaking chemical, it can be used together with other papermaking chemicals in order to achieve the properties required of various kinds of paper. Examples of other papermaking chemicals that can be used include fillers, dyes, rosin-based sizing agents for acidic papermaking, rosin-based sizing agents for weakly acidic papermaking, rosin-based sizing agents for neutral papermaking, alkyl ketene dimer-based sizing agents, alkenylsuccinic anhydride-based sizing agents, special modified rosin-based sizing agents, and other such acidic, weakly acidic, neutral, and alkaline papermaking sizing agents, synthesized sizing agents, wet strength agents, retention improving agents, and drainage improving agents as well as defoaming agents. These can be used singly or in combinations of two or more types. Examples of fillers include clay, talc, titanium oxide, and ground or precipitated calcium carbonate.

When a papermaking chemical containing a (meth)acrylamide polymer manufactured according to the present invention is used as a sizing auxiliary, the pH of the pulp slurry will have less effect on the improvement in sizing than with a conventional papermaking chemical, and the difference in performance compared to a conventional papermaking chemical will be particularly great when the pH of the pulp slurry is 6 or higher.

When a papermaking chemical containing a (meth)acrylamide polymer manufactured according to the present invention is used as a plybond strength improver, the polymerization solution containing the (meth)acrylamide polymer is diluted with water (may also contain an organic solvent), and this dilute solution is applied by spraying or another such method to the wet paper surface immediately after its production. The wet paper thus coated can be combined with separately prepared wet paper that has not be coated, and this combined wet paper then dehydrated and dried, which produces a multiply board. Instead of spraying the above-mentioned dilute solution onto the wet paper surface, it is also effective to coat a dried paper surface with the above-mentioned dilute solution by spraying or the like and then combine.

When the papermaking chemical of the present invention is used as a plybond strength improver, the polymerization solution containing the above-mentioned (meth)acrylamide polymer synthesized according to the present invention may be sprayed, either directly or as a dilute solution produced by diluting with water (may also contain an organic solvent), but other papermaking chemicals used in the past as plybond strength improvers, such as starches, modified starches, casein, and carboxymethyl cellulose, can also be contained along with the (meth)acrylamide polymer in the polymerization solution or the dilute solution in order to achieve the properties required of various kinds of paper.

When a papermaking chemical containing a (meth)acrylamide polymer manufactured according to the present invention is used as an externally added paper strengthener, the above-mentioned polymerization solution or a dilute solution obtained by diluting with water (may also contain an organic solvent) can be applied as the above-mentioned papermaking chemical to paper or cardboard by a known method. A size press, film press, gate roll coater, blade coater, calender, bar coater, knife coater, air knife coater, or the like can be used in the coating operation, and spray coating can also be performed.

When the papermaking chemical of the present invention is used as an externally added paper strengthener, a polymerization solution containing the above-mentioned (meth)acrylamide polymer synthesized according to the present invention, or a dilute solution thereof (may also contain an organic solvent), can be applied, but this polymerization solution or dilute solution may also contain a natural or synthetic water-soluble polymer, such as a starch (such as ordinary starch, oxidized starch, cationic starch, or amphoteric starch), a cellulose (such as carboxymethyl cellulose), a polyvinyl alcohol, or a (meth)acrylamide polymer other than the (meth)acrylamide polymer of the present invention, or may be used along with the above-mentioned polymerization solution or dilute solution. The polymerization solution or dilute solution may also contain a surface sizing agent, antislip agent, preservative, defoaming agent, viscosity regulator, rustproofer, releasing agent, flame retardant, dye, or the like in order to achieve the properties required of various kinds of paper, and these may be used along with the above-mentioned polymerization solution or dilute solution.

Paper containing the (meth)acrylamide polymer of the present invention is obtained, for example, as paper produced using the papermaking chemical of the present invention, combined paper produced by coating wet paper with the papermaking chemical, paper coated with the papermaking chemical, or the like, and examples of applications for this paper include PPC paper, inkjet recording paper, laser printer paper, form paper, art paper, cast paper, wood-free coated paper, and other types of printed information paper, photographic paper, kraft paper, pure white roll paper and other types of wrapping paper, notebook paper, book paper, printing paper, newsprint, and other types of paper, manila board, white board, chip board, ivory board, and other such paperbox boards, liner board, core board, corrugating medium, and so forth.

The present invention will now be described in more specific terms through examples and comparative examples, but it is not limited to or by the following examples. All percentages are by weight unless otherwise specified.

Method for Synthesizing the Monomer Expressed by General Formula 1

SYNTHESIS EXAMPLE 1

Synthesis of 2-propene-1-aminium, N,N,N,2-tetramethyl, chloride (PATMC)

147.78 g (0.75 mol) of 30% trimethylamine and 45.28 g (0.50 mol) of 1-chloro-2-methyl-2-propene were slowly added dropwise to a vessel at room temperature such that the reaction temperature did not exceed 40° C., and the reaction was continued for 3 hours at 50° C. after the dropping. Upon completion of the reaction, the trimethylamine was distilled off with a solvent, after which freeze drying was performed to obtain 73.30 g (0.49 mol; 98% yield) of 2-propene-1-aminium, N,N,N,2-tetramethyl, chloride in the form of a white powder. The structure of the 2-propene-1-aminium, N,N,N,2-tetramethyl, chloride thus obtained was confirmed by $^1$H-NMR (400 MHz)

SYNTHESIS EXAMPLE 2

Synthesis of 2-propene-1-aminium, N,N-diethyl-2-methyl, hydrochloride (PADEMHC)

54.86 g (0.75 mol) of diethylamine and 45.28 g (0.50 mol) of 1-chloro-2-methyl-2-propene were dissolved in chloroform (100.14 g), 20.0 g of sodium hydroxide was added, and the system was allowed to react for 15 hours at 70° C. Upon completion of the reaction, the chloroform solution was washed with a sodium carbonate aqueous solution to remove the unreacted diethylamine, diethylamine hydrochloride, and sodium hydroxide, which yielded a chloroform solution of N,N-diethyl-2-methyl-2-propene-1-amine. 150 g of a 4 N hydrochloric acid aqueous solution was added to the chloroform solution, the N,N-diethyl-2-methyl-2-propene-1-amine was converted into a hydrochloride and extracted from the aqueous phase, and the water was removed by freeze drying, which yielded 60.57 g (0.37 mol; 74% yield) of 2-propene-1-aminium, N,N-diethyl-2-methyl, hydrochloride in the form of a white powder. The structure of the 2-propene-1-aminium, N,N-diethyl-2-methyl, hydrochloride thus obtained was confirmed by $^1$H-NMR (400 MHz)

SYNTHESIS EXAMPLE 3

Synthesis of 2-propene-1-aminium, N,N,N-triethyl-2-methyl, chloride (PATEMC)

50.60 g (0.50 mol) of triethylamine and 45.28 g (0.50 mol) of 1-chloro-2-methyl-2-propene were dissolved in 2-propanol (95.88 g), and the system was allowed to react for 15 hours at 80° C. Upon completion of the reaction, the 2-propanol distilled off with a solvent to obtain 94.91 g (0.49 mol; 99% yield) of 2-propene-1-aminium, N,N,N-triethyl-2-methyl, chloride in the form of a white powder. The structure of the 2-propene-1-aminium, N,N,N-triethyl-2-methyl, chloride thus obtained was confirmed by $^1$H-NMR (400 MHz).

SYNTHESIS EXAMPLES 4, 5, AND 6

Synthesis of 2-propene-1-aminium, N,N,N-tributyl-2-methyl, chloride (PATBMC), 2-propene-1-aminium, N,N,2-trimethyl-N-octadecyl, chloride (PATMODC), and benzenemethaneaminium, N,N-dimethyl-N-(2-methyl-2-propenyl), chloride (BMADMMPC)

Other than changing the composition and reaction conditions as shown in Table 1, everything was carried out in the same manner as in Synthesis Example 3. The structure of the products was confirmed by $^1$H-NMR (400 MHz).

SYNTHESIS EXAMPLES 7, 8, AND 9

Synthesis of N-methyl-N-(2-methyl-2-propenyl) morpholinium, chloride (MMPMC), 2-propene-1-aminium, N-hydroxyethyl-N,N,2-trimethyl, chloride (PAHETMC), and 2-propene-1-aminium, N,N-dihydroxyethyl-N,2-dimethyl, chloride (PADHEDMC)

Other than changing the composition and reaction conditions as shown in Table 1, everything was carried out in the same manner as in Synthesis Example 1. The structure of the products was confirmed by $^1$H-NMR (400 MHz).

SYNTHESIS EXAMPLE 10

Synthesis of 2-propene-1-aminium, N-hydroxyethyl-N,2-dimethyl, hydrochloride (PAHEDMHC))

20.0 g of sodium hydroxide was added to 56.33 g (0.75 mol) of 2-hydroxy-N-methylethylamine and 101.61 g water, after which 45.28 g (0.50 mol) of 1-chloro-2-methyl-2-propene was slowly added dropwise at room temperature. Upon completion of the dropping, the system was allowed to react for 15 hours at 80° C. Upon completion of the reaction, the 150 g of chloroform added and the system was washed with a sodium carbonate aqueous solution to remove the unreacted 2-hydroxy-N-methylethylamine, 2-hydroxy-N-methylethylamine hydrochloride, and sodium hydroxide, which yielded a chloroform solution of N-hydroxyethyl-N,2-dimethyl-2-propene-1-amine. 150 g of a 4 N hydrochloric acid aqueous solution was added to the chloroform solution, the N-hydroxyethyl-N,2-dimethyl-2-propene-1-amine was converted into a hydrochloride and extracted into the aqueous phase, and the water was removed by freeze drying, which yielded 55.50 g (0.34 mol; 67% yield) of 2-propene-1-aminium, N-hydroxyethyl-N,2-dimethyl, hydrochloride in the form of a white powder. The structure of the 2-propene-1-aminium, N-hydroxyethyl-N,2-dimethyl, hydrochloride thus obtained was confirmed by $^1$H-NMR (400 MHz).

TABLE 1

| Syn. Ex. | Monomer (a) | methallyl chloride (mol) | Amine | (mol) | Solvent | (g) | React. conc. (%) | Other | React. temp. (° C.) | React. time (hrs) | Yield (%) |
|---|---|---|---|---|---|---|---|---|---|---|---|
| 1 | PATMC | 0.5 | trimethylamine | 0.75 | H$_2$O | 103.45*[1] | 46.4 | | 50 | 3 | 98 |
| 2 | PADEMHC | 0.5 | diethylamine | 0.75 | CHCl$_3$ | 100.14 | 50 | NaOH: 20.0 g | 70 | 15 | 74 |
| 3 | PATEMC | 0.5 | triethylamine | 0.5 | IPA | 95.88 | 50 | | 80 | 15 | 99 |
| 4 | PATBMC | 0.5 | tributylamine | 0.5 | IPA | 137.96 | 50 | | 80 | 15 | 31 |
| 5 | PATMODC | 0.5 | N,N-dimethyloctadecylamine | 0.5 | IPA | 195.07 | 50 | | 80 | 15 | 82 |
| 6 | BMADMMPC | 0.5 | N,N-dimethylbenzylamine | 0.5 | IPA | 112.88 | 50 | | 80 | 10 | 95 |
| 7 | MMPMC | 0.5 | N-methylmorpholine | 0.5 | H$_2$O | 31.95 | 75 | | 80 | 10 | 99 |
| 8 | PAHETMC | 0.5 | N,N-dimethylaminoethanol | 0.5 | H$_2$O | 29.95 | 75 | | 80 | 5 | 99 |
| 9 | PADHEDMC | 0.5 | N,N-dihydroxyethylmethylamine | 0.5 | H$_2$O | 34.95 | 75 | | 80 | 5 | 99 |
| 10 | PAHEDMHC | 0.5 | 2-hydroxy-N-methylethylamine | 0.75 | H$_2$O | 101.61 | 50 | NaOH: 20.0 g | 80 | 15 | 67 |

*[1]The water in Synthesis Example 1 originated in the 30% tirmethylamine aqueous solution.
IPA: 2-propanol
CHCl$_3$: chloroform
PATMC: 2-propene-1-aminium, N,N,N,2-tetramethyl, chloride
PADEMHC: 2-propene-1-aminium, N,N-diethyl-2-methyl, hydrochloride
PATEMC: 2-propene-1-aminium, N,N,N-triethyl-2-methyl, chloride
PATBMC: 2-propene-1-aminium, N,N,N-tributyl-2-methyl, chloride
PATMODC: 2-propene-1-aminium, N,N,2-trimethyl-N-octadecyl, chloride
BMADMMPC: benzenemethaneaminium, N,N-dimethyl-N-(2-methyl-2-propenyl), chloride
MMPMC: N-methyl-N-(2-methyl-2-propenyl)morpholinium, chloride
PAHETMC: 2-propene-1-aminium, N-hydroxyethyl-N,N,2-trimethyl, chloride
PADHEDMC: 2-propene-1-aminium, N,N-dihydroxyethyl-N,2-dimethyl, chloride
PAHEDMHC: 2-propene-1-aminium, N-hydroxyethyl-N,2-dimethyl, hydrochloride

EXAMPLE 1

417.49 g of water and, as monomers (A), 192.84 g (66.30 mol %) of a 50% 2-propenamide (that is, acrylamide) aqueous solution, 6.44 g (2.0 mol %) of N,N-dimethyl-2-(2-methylpropenoyloxy)ethylamine (that is, dimethylaminoethyl methacrylate), 4.00 g (1.5 mol %) of 2-methylenebutanedioic acid (that is, itaconic acid), and 12.26 g (0.20 mol %) of a 5% 2-propene-1-aminium, N,N,N,2-tetramethyl, chloride aqueous solution were supplied to a 1 L four-necked flask equipped with a stirrer, a thermometer, a reflux condenser tube, and a nitrogen gas introduction tube. The pH was adjusted to 3.0 with a 30% sulfuric acid aqueous solution. The temperature was then raised to 60° C. under a nitrogen gas atmosphere, 4.68 g of a 5% ammonium persulfate aqueous solution was added, and the temperature was raised to 90° C. in 20 minutes. At the point when the reaction temperature reached 90° C., 5.65 g of water and monomers (B), composed of 81.35 g (27.95 mol %) of a 50% 2-propenamide aqueous solution, 10.90 g (1.5 mol %) of a 76% N,N-dimethyl-N-[2[(1-oxo-2-propenyl)oxy]ethyl]benzenemethaneaminium chloride (that is, acryloyloxyethyldimethylbenzylammonium chloride) aqueous solution, 1.33 g (0.5 mol %) of 2-methylenebutanedioic acid, and 3.06 g (0.05 mol %) of a 5% 2-propene-1-aminium, N,N,N,2-tetramethyl, chloride aqueous solution, were added dropwise over a period of 10 minutes, and polymerization was conducted at 85° C. 9.34 g of a 5% ammonium persulfate aqueous solution was added after 20 minutes of dropwise addition of monomers (B), and polymerization was continued at 85° C. At the point when the estimated viscosity at 25° C. was between 6000 and 8000 mPa·s, the system was cooled and the reaction halted. This yielded a polymer solution (A-1) with a solids content of 20.4%, a pH of 3.9, and a viscosity (25° C.; measured with a Brookfield rotary viscometer) of 6210 mPa·s. The amount of unreacted 2-propenamide in the resulting polymer solution (A-1) was quantified ($^1$H-NMR, 400 MHz), which revealed the unreacted 2-propenamide content to be 0.03 mol % with respect to the total monomers used (100 mol %). Table 3 shows the properties of the (meth)acrylamide polymer (A-1) thus obtained.

COMPARATIVE EXAMPLES 1 TO 3

Other than changing the compositions of monomers (A) and monomers (B) as shown in Table 2, everything was conducted in the same manner as in Example 1. Table 3 shows the properties of the (meth)acrylamide polymers (a-1) to (a-3) thus obtained. In Comparative Examples 1 and 2, gelling occurring during polymerization, preventing the measurement of the properties.

TABLE 2

| Acrylamide polymer | | | Monomer (a) (mol %) | Monomer (b) (mol %) | Monomer (c) anionic (mol %) | Monomer (c) cationic (mol %) | Component (g) (mol %) | Monomers (A) monomers (B) total mol (%) | Polymerization conc. (%) |
|---|---|---|---|---|---|---|---|---|---|
| Ex. 1 | A-1 | monomers (A) | PATMC/0.20 | AAm/66.30 | IA/1.5 | DM/2.0 | | 70.0 | 20 |
| | | monomers (B) | PATMC/0.05 | AAm/27.95 | IA/0.5 | DABz/1.5 | | 30.0 | |
| Comp. Ex. 1 | a-1 | monomers (A) | | AAm/66.5 | IA/1.5 | DM/2.0 | | 70.0 | 20 |
| | | monomers (B) | | AAm/28.0 | IA/0.5 | DABz/1.5 | | 30.0 | |
| Comp. Ex. 2 | a-2 | monomers (A) | | AAm/61.5 | IA/1.5 | DM/2.0 | ALA/5.0 | 70.0 | 20 |
| | | monomers (B) | | AAm/27.0 | IA/0.5 | DABz/1.5 | ALA/1.0 | 30.0 | |
| Comp. Ex. 3 | a-3 | monomers (A) | | AAm/66.45 | IA/1.5 | DM/2.0 | NaH$_2$PO$_2$/0.05 | 70.0 | 20 |
| | | monomers (B) | | AAm/27.99 | IA/0.5 | DABz/1.5 | NaH$_2$PO$_2$/0.01 | 30.0 | |

Notes to Table 2:
Component (g): A compound having the function of lowering the viscosity of a polymer
AAm: 2-propenamide (that is, acrylamide)
IA: 2-methylenebutanedioic acid (that is, itaconic acid)
DM: N,N-dimethyl-2-(2-methylpropenoyloxy)ethylamine (that is, dimethylaminoethylmethacrylate)
DABz: N,N-dimethyl-N-[2[(1-oxo-2-propenyl)oxy]ethyl]benzenemethaneaminium chloride (that is, acryloyloxyethyldimethylbenzylammonium chloride)
PATMC: 2-propene-1-aminium, N,N,N,2-tetramethyl, chloride
ALA: 2-propenylamine (that is, allylamine)
NaH$_2$PO$_2$: hypophosphorous acid

TABLE 3

| Acrylamide polymer | | Solids (%) | pH | Viscosity (mPa · s) | Unreacted AAm (mol %) |
|---|---|---|---|---|---|
| Ex. 1 | A-1 | 20.4 | 3.9 | 6210 | 0.03 |
| Comp. Ex. 1 | a-1 | — | — | — | — |
| Comp. Ex. 2 | a-2 | — | — | — | — |
| Comp. Ex. 3 | a-3 | 20.4 | 3.8 | 6900 | 0.09 |

Dashes indicate that measurement was impossible because of gelling.

EXAMPLE 2

394.14 g of water, 259.10 g (92.93 mol %) of a 50% 2-propenamide (that is, acrylamide) aqueous solution, 5.10 g (2.0 mol %) of 2-methylenebutanedioic acid (that is, itaconic acid), 17.40 g (2.5 mol %) of a 76% N,N-dimethyl-N-[2[(1-oxo-2-propenyl)oxy]ethyl]benzenemethaneaminium chloride (that is, acryloyloxyethyldimethylbenzylammonium chloride) aqueous solution, 10.98 g (1.5 mol %) of a 76% N,N-dimethyl-N-[2[(2-methyl-1-oxo-2-propenyl)oxy]ethyl]benzenemethaneaminium chloride (that is, methacryloyloxyethyldimethylbenzyl-ammonium chloride) aqueous solution, 0.98 g (0.5 mol %) of 2-methylpropeloyloxymethyl (that is, methyl methacrylate), 41.33 g (0.55 mol %) of a 5% 2-propene-1-aminium, N,N,N-triethyl-2-methyl, chloride aqueous solution, and 19.55 g (0.02 mol %) of a 0.5% tri(propeloyloxy)methane (that is, triacrylformal) aqueous solution were supplied to a 1 L four-necked flask equipped with a stirrer, a thermometer, a reflux condenser tube, and a nitrogen gas introduction tube. The pH was adjusted to 3.0 with a 30% sulfuric acid aqueous solution. The temperature was then raised to 60° C. under a nitrogen gas atmosphere, 4.68 g of a 5% ammonium persulfate aqueous solution was added, and the temperature was raised to 90° C. in 20 minutes, after which polymerization was conducted at 85° C. 1 hour after the start of polymerization, 9.34 g of a 5% ammonium persulfate aqueous solution was added, and at the point when the estimated viscosity at 25° C. was between 6000 and 8000 mPa·s, the system was cooled and the reaction halted. This yielded a polymer solution (B-1) with a solids content of 20.3%, a pH of 3.8, and a viscosity (25° C.; measured with a Brookfield rotary viscometer) of 7910 mPa·s. The amount of unreacted 2-propenamide in the resulting polymer solution (B-1) was quantified ($^1$H-NMR, 400 MHz), which revealed the unreacted 2-propenamide content to be 0.02 mol % with respect to the total monomers used (100 mol %). Table 5 shows the properties of the (meth)acrylamide polymer (B-1) thus obtained.

COMPARATIVE EXAMPLES 4 TO 8

Other than changing the composition of the monomer aqueous solution as shown in Table 4, everything was conducted in the same manner as in Example 2. Table 5 shows the properties of the (meth)acrylamide polymers (b-1) to (b-5) thus obtained. In Comparative Examples 4 to 6, gelling occurring during polymerization, preventing the measurement of the properties.

EXAMPLE 3

TABLE 5

| Acrylamide polymer | | Solids (%) | pH | Viscosity (mPa·s) | Unreacted AAm (mol %) |
|---|---|---|---|---|---|
| Ex. 2 | B-1 | 20.3 | 3.8 | 7910 | 0.02 |
| Comp. Ex. 4 | b-1 | — | — | — | — |
| Comp. Ex. 5 | b-2 | — | — | — | — |
| Comp. Ex. 6 | b-3 | — | — | — | — |
| Comp. Ex. 7 | b-4 | 20.7 | 3.5 | 6090 | 0.09 |
| Comp. Ex. 8 | b-5 | 20.7 | 3.3 | 7720 | 0.07 |

Dashes indicate that measurement was impossible because of gelling.

391.94 g of water and, as monomers (A), 270.64 g (92.98 mol %) of a 50% 2-propenamide (that is, acrylamide) aqueous solution, 2.12 g (0.5 mol %) of 2-methyl-N-propenoyl-2-aminopropanesulfonic acid (that is, 2-acrylamide-2-methylpropanesulfonic acid), 6.44 g (2.0 mol %) of N,N-dimethyl-2-(2-methylpropeloyloxy)ethylamine (that is, dimethylaminoethyl methacrylate), 14.54 g (2.0 mol %) of a 76% N,N-dimethyl-N-[2[(1-oxo-2-propenyl)oxy]ethyl]benzenemethaneaminium chloride (that is, acryloyloxyethyldimethylbenzylammonium chloride) aqueous solution, 46.22 g (0.50 mol %) of a 5% aqueous solution of benzenemethaneaminium, N,N-dimethyl-N-(2-methyl-2-propenyl) chloride, and 20.42 g (0.02 mol %) of a 0.5% aqueous solution of tri(propeloyloxy)methane (that is, triacrylformal) were supplied to a 1 L four-necked flask equipped with a stirrer, a thermometer, a reflux condenser tube, and a nitrogen gas introduction tube. The temperature was then raised to 60° C. under a nitrogen gas atmosphere, 4.68 g of a 5% ammonium persulfate aqueous solution was added, and the temperature was raised to 90° C. in 20 minutes. At the point when

TABLE 4

| Acrylamide polymer | | Monomer (a) (mol %) | Monomer (b) (mol %) | Monomer (c) anionic (mol %) | Monomer (c) cationic (mol %) | Crosslinking agent (d) (mol %) | Monomer (c1) (mol %) | Other monomer (f) (mol %) | Component (g) (mol %) | Polymerization conc. (%) |
|---|---|---|---|---|---|---|---|---|---|---|
| Ex. 2 | B-1 | PATEMC/0.55 | AAm/92.93 | IA/2.0 | DABz/1.5 DMBz/1.5 | TAF/0.02 | | MMA/0.5 | | 20 |
| Comp. Ex. 4 | b-1 | | AAm/91.48 | IA/2.0 | DABz/1.5 DMBz/2.5 | TAF/0.02 | SAS/2.5 | | | 20 |
| Comp. Ex. 5 | b-2 | | AAm/91.48 | IA/2.0 | DABz/1.5 DMBz/2.5 | TAF/0.02 | | | MALA/2.5 | 20 |
| Comp. Ex. 6 | b-3 | | AAm/91.48 | IA/2.0 | DABz/1.5 DMBz/2.5 | TAF/0.02 | | | ALA/2.5 | 20 |
| Comp. Ex. 7 | b-4 | | AAm/93.73 | IA/2.0 | DABz/1.5 DMBz/2.5 | TAF/0.02 | | | NaH$_2$PO$_2$/0.25 | 20 |
| Comp. Ex. 8 | b-5 | | AAm/93.53 | IA/2.0 | DABz/1.5 DMBz/2.5 | TAF/0.02 | SMAS/0.45 | | | 20 |

Notes to Table 4:
Component (g): A compound having the function of lowering the viscosity of a polymer
AAm: 2-propenamide (that is, acrylamide)
IA: 2-methylenebutanedioic acid (that is, itaconic acid)
MMA: 2-methylpropenoyloxymethyl (that is, methyl methacrylate)
DMBz: N,N-dimethyl-N-[2[(2-methyl-1-oxo-2-propenyl)oxy]ethyl]benzenemethaneaminium chloride (that is, methacryloyloxyethyldimethylbenzylammonium chloride)
DABz: N,N-dimethyl-N-[2[(1-oxo-2-propenyl)oxy]ethyl]benzenemethaneaminium chloride (that is, acryloyloxyethyldimethylbenzylammonium chloride)
PATEMC: 2-propene-1-aminium, N,N,N,-triethyl-2-methyl, chloride
TAF: tri(propenoyloxy)methane (that is, triacrylformal)
SMAS: sodium 2-methyl-2-propene-1-sulfonate (that is, sodium methallylsulfonate)
SAS: sodium 2-propene-1-sulfonate (that is, sodium allylsulfonate)
MALA: 2-methyl-2-propen-1-ol (that is, methallyl alcohol)
ALA: 2-propenylamine (that is, allylamine)
NaH$_2$PO$_2$: hypophosphorous acid the reaction temperature reached 90° C., monomer (B), composed of 5.33 g (2.0 mol %) of 2-methylenebutandioic acid (that is, itaconic acid), was added all at once, and polymerization was conducted at 85° C. 9.34 g of a 5% ammonium persulfate aqueous solution was added 30 minutes after the addition of monomer (B), and polymerization was continued at 85° C. At the point when the estimated viscosity at 25° C. was between 6000 and 8000 mPa·s, the system was cooled and the reaction halted. This yielded a polymer solution (C-1) with a solids content of 20.7%, a pH of 3.6, and a viscosity (25° C.; measured with a Brookfield rotary viscometer) of 6050 mPa·s. The amount of unreacted 2-propenamide in the resulting polymer solution (C-1) was quantified ($^1$H-NMR, 400 MHz), which revealed no unreacted 2-propenamide (under the $^1$H-NMR detection limit). Table 7 shows the properties of the (meth)acrylamide polymer (C-1) thus obtained.

EXAMPLE 4

374.89 g of water, 0.8 g of citric acid (as a chelating agent), and, as monomers (A), 201.92 g (71.16 mol %) of a 50% 2-propenamide (that is, acrylamide) aqueous solution, 4.71 g (1.5 mol %) of N,N-dimethyl-2-(2-methylpropeloyloxy) ethylamine (that is, dimethylaminoethyl methacrylate), 5.19 g (2.0 mol %) of 2-methylenebutanedioic acid (that is, itaconic acid), 12.31 g (0.04 mol %) of 1% di(propenoylamino)methane (that is, methylenebisacrylamide), and 22.96 g (0.30 mol %) of a 5% N-methyl-N-(2-methyl-2-propenyl)morpholinium chloride aqueous solution were supplied to a 1 L four-necked flask equipped with a stirrer, a thermometer, a reflux condenser tube, and a nitrogen gas introduction tube. The pH was adjusted to 3.0 with a 30% sulfuric acid aqueous solution. The temperature was then raised to 60° C. under a nitrogen gas atmosphere, 4.68 g of a 5% ammonium persulfate aqueous solution was added, and the temperature was raised to 90° C. in 20 minutes. At the point when the reaction temperature reached 90° C., 23.51 g of water and monomers (B), composed of 62.28 g (21.95 mol %) of a 50% 2-propenamide aqueous solution, 17.71 g (2.5 mol %) of a 76% N,N-dimethyl-N-[2[(1-oxo-2-propenyl)oxy]ethyl]benzenemethaneaminium chloride (that is, acryloyloxyethyldimethylbenzylammonium chloride) aqueous solution, 1.66 g (0.5 mol %) of 65% ethylenephosphonic acid (that is, vinylphosphonic acid), and 3.83 g (0.05 mol %) of a 5% N-methyl-N-(2-methyl-2-propenyl)morpholinium chloride aqueous solution, were added dropwise over a period of 10 minutes, and polymerization was conducted at 85° C. 9.34 g of a 5% ammonium persulfate aqueous solution was added after 20 minutes of dropwise addition of monomers (B), and polymerization was continued at 85° C. At the point when the estimated viscosity at 25° C. was between 6000 and 8000 mPa·s, the system was cooled and the reaction halted. This yielded a polymer solution (C-2) with a solids content of 20.3%, a pH of 3.6, and a viscosity (25° C.; measured with a Brookfield rotary viscometer) of 6350 mPa·s. The amount of unreacted 2-propenamide in the resulting polymer solution (C-2) was quantified ($^1$H-NMR, 400 MHz), which revealed the unreacted 2-propenamide content to be 0.03 mol % with respect to the total monomers used (100 mol %). Table 7 shows the properties of the (meth)acrylamide polymer (C-2) thus obtained.

EXAMPLES 5 TO 13 AND COMPARATIVE EXAMPLES 9 AND 10

Other than changing the compositions of the monomers (A) and monomers (B) as shown in Table 6, everything was conducted in the same manner as in Example 4. Table 7 shows the properties of the resulting (meth)acrylamide polymers (C-3) to (C-11), and (c-1) and (c-2).

TABLE 6

| | Acrylamide polymer | | Monomer (a) (mol %) | Monomer (b) (mol %) | Monomer (c) anionic (mol %) | Monomer (c) cationic (mol %) | Crosslinking agent (d) (mol %) | Monomer (c1) (mol %) | Other monomer (f) (mol %) | Monomers (A) monomers (B) total mol (%) | Polymerization conc. (%) |
|---|---|---|---|---|---|---|---|---|---|---|---|
| Ex. 3 | C-1 | monomers (A) | BMADMMPC/ 0.50 | AAm/ 92.98 | AMPS/ 0.5 | DM/2.0 DABz/2.0 | TAF/0.02 | | | 98.0 | 20 |
| | | monomers (B) | | | IA/2.0 | | | | | 2.0 | |
| Ex. 4 | C-2 | monomers (A) | MMPMC/ 0.30 | AAm/ 71.16 | IA/2.0 | DM/1.5 | MBAAm/0.04 | | | 75.0 | 20 |
| | | monomers (B) | MMPMC/ 0.05 | AAm/ 21.95 | VPA/0.5 | DABz/2.5 | | | | 25.0 | |
| Ex. 5 | C-3 | monomers (A) | PADEMHC/ 0.30 | AAm/ 66.18 | IA/2.0 | DM/1.5 | MBAAm/0.02 | | | 70.0 | 20 |
| | | monomers (B) | PADEMHC/ 0.05 | AAm/ 26.93 | IA/0.5 | DABz/2.5 | MBAAm/0.02 | | | 30.0 | |
| Ex. 6 | C-4 | monomers (A) | PATBMC/ 0.30 | AAm/ 66.18 | IA/2.0 | DM/1.5 | MBAAm/0.02 | | | 70.0 | 20 |
| | | monomers (B) | PATBMC/ 0.05 | AAm/ 26.93 | IA/0.5 | DABz/2.5 | MBAAm/0.02 | | | 30.0 | |
| Ex. 7 | C-5 | monomers (A) | PATEMC/ 0.30 | AAm/ 71.10 | IA/2.0 | DPA/1.5 | DMAAm/0.1 | | | 75.0 | 20 |
| | | monomers (B) | PATEMC/ 0.05 | AAm/ 21.85 | IA/0.5 | DABz/2.5 | DMAAm/0.1 | | | 25.0 | |
| Ex. 8 | C-6 | monomers (A) | PATMC/ 0.30 | AAm/ 61.69 | IA/1.0 | DPA/2.0 | TAF/0.01 | | | 65.0 | 20 |
| | | monomers (B) | PATMC/ 0.05 | AAm/ 31.44 | IA/1.5 | DMBz/2.0 | TAF/0.01 | | | 35.0 | |
| Ex. 9 | C-7 | monomers (A) | PAHEDMHC/ 0.35 | AAm/ 46.05 | IA/2.0 | DPA/1.5 | DMAAm/0.1 | | | 50.0 | 20 |
| | | monomers (B) | PAHEDMHC/ 0.10 | AAm/ 46.80 | IA/0.5 | DABz/2.5 | DMAAm/0.1 | | | 50.0 | |

TABLE 6-continued

| | Acrylamide polymer | | Monomer (a) (mol %) | Monomer (b) (mol %) | Monomer (c) anionic (mol %) | Monomer (c) cationic (mol %) | Crosslinking agent (d) (mol %) | Monomer (c1) (mol %) | Other monomer (f) (mol %) | Monomers (A) Monomers (B) total mol (%) | Polymerization conc. (%) |
|---|---|---|---|---|---|---|---|---|---|---|---|
| Ex. 10 | C-8 | monomers (A) | PADHEDMC/ 0.30 | AAm/ 55.68 | IA/2.0 | DM/1.5 | MBAAm/0.02 | | AN/0.5 | 60.0 | 20 |
| | | monomers (B) | PADHEDMC/ 0.05 | AAm/ 36.85 | IA/0.5 | DMBz/1.0 DABz/1.5 | DMAAm/0.1 | | | 40.0 | |
| Ex. 11 | C-9 | monomers (A) | PAHETMC/ 0.30 | AAm/ 66.67 | IA/0.5 | DM/2.0 | TAF/0.01 MBAAm/0.02 | | NIPAM/ 0.5 | 70.0 | 20 |
| | | monomers (B) | PAHETMC/ 0.05 | AAm/ 25.95 | IA/2.0 | DMBz/2.0 | | | | 30.0 | |
| Ex. 12 | C-10 | monomers (A) | PAHETMC/ 0.27 | AAm/ 46.93 MAAm/ 5.0 | IA/2.0 | DABz/0.7 | DMAAm/0.1 | | | 55.0 | 20 |
| | | monomers (B) | PATMODC/ 0.03 | AAm/ 40.37 | IA/0.5 | DM/2.5 DABz/1.5 | DMAAm/0.1 | | | 45.0 | |
| Ex. 13 | c-11 | monomers (A) | PAHETMC/ 0.16 | AAm/ 51.88 | IA/2.0 | DABz/0.7 | DMAAm/0.1 | SMAS/ 0.16 | | 55.0 | 20 |
| | | monomers (B) | PAHETMC/ 0.03 | AAm/ 40.34 | IA/0.5 | DM/2.5 DABZ/1.5 | DMAAm/0.1 | SMAS/ 0.03 | | 45.0 | |
| Comp. Ex. 9 | c-1 | monomers (A) | | AAm/ 67.05 | IA/0.5 | DM/2.0 | DMAAm/0.1 | SMAS/ 0.35 | | 70.0 | 20 |
| | | monomers (B) | | AAm/ 25.85 | IA/2.0 | DABz/2.0 | DMAAm/0.1 | SMAS/ 0.05 | | 30.0 | |
| Comp. Ex. 10 | c-2 | monomers (A) | | AAm/ 51.85 | IA/2.0 | DABz/0.7 | DMAAm/0.1 | SMAS/ 0.35 | | 55.0 | 20 |
| | | monomers (B) | | AAm/ 40.35 | IA/0.5 | DM/2.5 DABz/1.5 | DMAAm/0.1 | SMAS/ 0.05 | | 45.0 | |

Notes to Table 6:
AAm: 2-propenamide (that is, acrylamide)
MAAm: 2-methyl-2-propenamide (that is, methacrylamide)
IA: 2-methylenebutanedioic acid (that is, itaconic acid)
DPA: N,N-dimethyl-2-(2-methylpropenoylamino)propylamine (that is, dimethylaminopropylacrylamide)
DM: N,N-dimethyl-2-(2-methylpropenoyloxy)ethylamine (that is, dimethylaminoethyl methacrylate
DMBz: N,N-dimethyl-N-[2[(2-methyl-1-oxo-2-propenyl)oxy]ethyl]benzenemethaneaminium chloride (that is, methacryloyloxyethyldimethyl-benzylammonium chloride)
DABz: N,N-dimethyl-N-[2[(1-oxo-2-propenyl)oxy]ethyl]benzenemethaneaminium chloride (that is, acryloyloxyethyldimethylbenzylammonium chloride)
AMPS: 2-methyl-N-propenoyl-2-aminopropanesulfonic acid (that is, 2-acrylamide-2-methylpropanesulfonic acid)
VPA: ethylenephosphonic acid (that is, vinylphosphonic acid)
DMAAm: N,N-dimethyl-2-propenamide (that is, dimethylacrylamide)
MBAAm: di(propenoyloxy)methane (that is, methylenebisacrylamide)
TAF: tri(propenoyloxy)methane (that is, triacrylformal)
PATMC: 2-propene-1-aminium, N,N,N,2-tetramethyl, chloride
PATEMC: 2-propene-1-aminium, N,N,N-triethyl-2-methyl, chloride
PADEMHC: 2-propene-1-aminium, N,N-diethyl-2-methyl, hydrochloride
PATBMC: 2-propene-1-aminium, N,N,N-tributyl-2-methyl, chloride
PATMODC: 2-propene-1-aminium, N,N,2-trimethyl-N-octadecyl, chloride
BMADMMPC: benzenemethaneaminium, N,N-dimethyl-N-(2-methyl-2-propenyl), chloride
MMPMC: N-methyl-N-(2-methyl-2-propenyl)morpholinium, chloride
PAHETMC: 2-propene-1-aminium, N-hydroxyethyl-N,N,2-trimethyl, chloride
PADHEDMC: 2-propene-1-aminium, N,N-dihydroxyethyl-N,2-dimethyl, chloride
PAHEDMHC: 2-propene-1-aminium, N-hydroxyethyl-N,2-dimethyl, hydrochloride
SMAS: sodium 2-methyl-2-propene-1-sulfonate (that is, sodium metallylsulfonate)
AN: 2-propenenitrile (that is, acrylonitrile)
NIPAM: N-(2-propyl)-propenamide (that is, N-isopropylacrylamide)

TABLE 7

| Acrylamide polymer | | Solids (%) | pH | Viscosity (mPa·s) | Unreacted AAm (mol %) |
|---|---|---|---|---|---|
| Ex. 3 | C-1 | 20.7 | 3.6 | 6050 | 0*[1] |
| Ex. 4 | C-2 | 20.3 | 3.6 | 6350 | 0.03 |
| Ex. 5 | C-3 | 20.7 | 3.7 | 6220 | 0*[1] |
| Ex. 6 | C-4 | 20.7 | 3.5 | 6090 | 0*[1] |
| Ex. 7 | C-5 | 20.5 | 3.6 | 7850 | 0*[1] |
| Ex. 8 | C-6 | 20.4 | 3.8 | 6120 | 0*[1] |
| Ex. 9 | C-7 | 20.5 | 3.5 | 7650 | 0*[1] |
| Ex. 10 | C-8 | 20.3 | 3.8 | 7890 | 0*[1] |
| Ex. 11 | C-9 | 20.4 | 3.5 | 6510 | 0*[1] |
| Ex. 12 | C-10 | 20.3 | 3.8 | 6920 | 0.02 |
| Ex. 13 | C-11 | 20.5 | 3.9 | 7820 | 0.03 |
| Comp. Ex. 9 | c-1 | 20.6 | 3.6 | 6320 | 0.04 |
| Comp. Ex. 10 | c-2 | 20.2 | 4.0 | 7700 | 0.05 |

*[1] Could not be detected by 1H-NMR

EXAMPLE 14

454.77 g of water and, as monomers (A), 170.62 g (62.398 mol %) of a 50% 2-propenamide (that is, acrylamide) aqueous solution, 6.26 g (2.5 mol %) of 2-methylenebutanedioic acid (that is, itaconic acid), 1.92 g (0.002 mol %) of a 0.5% tri(propeloyloxy)methane (that is, triacrylformal) aqueous solution, and 6.08 g (0.10 mol %) of a 5% sodium 2-methyl-2-propene-1-sulfonate (that is, sodium methallylsulfonate) aqueous solution were supplied to a 1 L four-necked flask equipped with a stirrer, a thermometer, a reflux condenser tube, and a nitrogen gas introduction tube. The temperature was then raised to 60° C. under a nitrogen gas atmosphere, 4.38 g of a 5% ammonium persulfate aqueous solution was added, and the temperature was raised to 90° C. in 20 minutes. 30 minutes after the start of the polymerization, 5.27 g of water and monomers (B), composed of 81.19 g (29.694 mol %) of a 50% 2-propenamide aqueous solution, 34.14 g (5.0 mol %) of a 76% N,N-dimethyl-N-[2[(1-oxo-2-propenyl)oxy]ethyl]benzenemethaneaminium chloride (that is, acryloyloxyethyldimethylbenzylammonium chloride) aqueous solution, 20.74 g (0.30 mol %) of a 5% 2-propene-1-aminium, N-hydroxyethyl-N,N,2-trimethyl, chloride aqueous solution, and 5.75 g (0.006 mol %) of 0.5% tri(propenoyloxy)methane, were added dropwise over a period of 10 minutes, and polymerization was conducted at 90° C. 4.38 g of a 5% ammonium persulfate aqueous solution was added after the dropwise addition of monomers (B), and polymerization was continued at 90° C. After 3 hours of reaction, the system was cooled and the reaction halted. This yielded a polymer solution (D-1) with a solids content of 20.2%, a pH of 4.5, and a viscosity (25° C.; measured with a Brookfield rotary viscometer) of 5450 mPa·s. The amount of unreacted 2-propenamide in the resulting polymer solution (D-1) was quantified ($^1$H-NMR, 400 MHz), which revealed no unreacted 2-propenamide (under the $^1$H-NMR detection limit). Table 9 shows the properties of the (meth)acrylamide polymer (D-1) thus obtained.

COMPARATIVE EXAMPLE 11

Other than changing the compositions of monomers (A) and monomers (B) as shown in Table 8, everything was conducted in the same manner as in Example 14. Table 9 shows the properties of the resulting (meth)acrylamide polymer.

TABLE 9

| Acrylamide polymer | | Solids (%) | pH | Viscosity (mPa · s) | Unreacted AAm (mol %) |
|---|---|---|---|---|---|
| Ex. 14 | D-1 | 20.2 | 4.5 | 5450 | 0*[1] |
| Comp. Ex. 11 | d-1 | 20.3 | 4.4 | 2950 | 0*[1] |

*[1]Could not be detected by 1H-NMR

EXAMPLE 15

369.86 g of water, 353.56 g (93.50 mol %) of a 50% 2-propenamide (that is, acrylamide) aqueous solution, 20.76 g (6.0 mol %) of 2-methylenebutanedioic acid (that is, itaconic acid), and 47.80 g (0.50 mol %) of a 5% 2-propene-1-aminium, N-hydroxyethyl-N,N,2-trimethyl, chloride aqueous solution were supplied to a 1 L four-necked flask equipped with a stirrer, a thermometer, a reflux condenser tube, and a nitrogen gas introduction tube. The pH was adjusted to 3.0 with a 25% sodium hydroxide aqueous solution. The temperature was then raised to 50° C. under a nitrogen gas atmosphere, 6.06 g of a 5% ammonium persulfate aqueous solution and 3.15 g of a 2% sodium metabisulfite aqueous solution were added, the temperature was raised to 85° C. in 25 minutes, and polymerization was conducted for 2 hours at 85° C., after which the system was cooled and the reaction halted. The polymer solution thus obtained was adjusted to a pH of 7 with a 25% sodium hydroxide aqueous solution, which yielded a polymer solution (E-1) with a solids content of 25.6%, a pH of 7.0, and a viscosity (25° C.; measured with a Brookfield rotary viscometer) of 8290 mPa·s. The amount of unreacted 2-propenamide in the resulting polymer solution (E-1) was quantified ($^1$H-NMR, 400 MHz), which revealed no unreacted 2-propenamide (under the

TABLE 8

| Acrylamide polymer | | | Monomer (a) (mol %) | Monomer (b) (mol %) | Monomer (c) anionic (mol %) | Monomer (c) cationic (mol %) | Crosslinking agent (d) (mol %) | Monomer (c1) (mol %) | Monomers (A) monomers (B) total mol (%) | Polymerization conc. (%) |
|---|---|---|---|---|---|---|---|---|---|---|
| Ex. 14 | D-1 | monomers (A) | | AAm/ 62.398 | IA/2.5 | | TAF/0.002 | SMAS/ 0.10 | 65.0 | 20 |
| | | monomers (B) | PAHETMC/ 0.30 | AAm/ 29.694 | | DABz/5.0 | TAF/0.006 | | 35.0 | |
| Comp. Ex. 11 | d-1 | monomers (A) | | AAm/ 62.398 | IA/2.5 | | TAF/0.002 | SMAS/ 0.10 | 65.0 | 20 |
| | | monomers (B) | | AAm 29.694 | | DABz/5.0 | TAF/0.006 | SMAS/ 0.30 | 35.0 | |

Notes to Table 8:
AAm: 2-propenamide (that is, acrylamide)
IA: 2-methylenebutanedioic acid (that is, itaconic acid)
DABz: N,N-dimethyl-N-[2[(1-oxo-2-propenyl)oxy]ethyl]benzenemethaneaminium chloride (that is, acryloyloxyethyldimethylbenzylammonium chloride)
TAF: tri(propenoyloxy)methane (that is, triacrylformal)
PAHETMC: 2-propene-1-aminium, N-hydroxyethyl-N,N,2-trimethyl, chloride
SMAS: sodium 2-methyl-2-propene-1-sulfonate (that is, sodium metallylsulfonate)

$^1$H-NMR detection limit). Table 11 shows the properties of the (meth)acrylamide polymer (E-1) thus obtained.

EXAMPLE 16

399.54 g of water, 19.94 g of urea (this urea accounting for 10% of the combined total of urea and monomers), 318.08 g (93.60 mol %) of a 50% 2-propenamide (that is, acrylamide) aqueous solution, 18.66 g (6.0 mol %) of 2-methylenebutanedioic acid (that is, itaconic acid), and 34.36 g (0.40 mol %) of a 5% 2-propene-1-aminium, N-hydroxyethyl-N,N,2-trimethyl, chloride aqueous solution were supplied to a 1 L four-necked flask equipped with a stirrer, a thermometer, a reflux condenser tube, and a nitrogen gas introduction tube. The pH was adjusted to 3.0 with a 25% sodium hydroxide aqueous solution. The temperature was then raised to 50° C. under a nitrogen gas atmosphere, 5.46 g of a 5% ammonium persulfate aqueous solution and 2.85 g of a 2% sodium metabisulfite aqueous solution were added, the temperature was raised to 85° C. in 25 minutes, and polymerization was conducted for 2 hours at 85° C., after which the system was cooled and the reaction halted. The polymer solution thus obtained was adjusted to a pH of 7 with a 25% sodium hydroxide aqueous solution, which yielded a polymer solution (E-2) with a solids content of 25.6%, a pH of 7.0, and a viscosity (25° C.; measured with a Brookfield rotary viscometer) of 7620 mPa·s. The amount of unreacted 2-propenamide in the resulting polymer solution (E-2) was quantified ($^1$H-NMR, 400 MHz), which revealed no unreacted 2-propenamide (under the $^1$H-NMR detection limit). Table 11 shows the properties of the (meth)acrylamide polymer (E-2) thus obtained.

TABLE 10

| Acrylamide polymer | Monomer (a) (mol %) | Monomer (b) (mol %) | Monomer (c) anionic (mol %) | Urea (%) | Polymerization concent. (%) |
|---|---|---|---|---|---|
| Ex. 15 | E-1 | PAHETMC/ 0.50 | AAm 93.5 | IA/6.0 | | 25 |
| Ex. 16 | E-2 | PAHETMC/ 0.40 | AAm 93.6 | IA/6.0 | 10 | 25 |

Notes to Table 10:
AAm: 2-propenamide (that is, acrylamide)
IA: 2-methylenebutanedioic acid (that is, itaconic acid)
PAHETMC: 2-propene-1-aminium, N-hydroxyethyl-N,N,2-trimethyl, chloride

TABLE 11

| Acrylamide polymer | Solids (%) | pH | Viscosity (mPa · s) | Unreacted AAm (mol %) |
|---|---|---|---|---|
| Ex. 15 | E-1 | 25.6 | 7.0 | 8290 | 0*[1] |
| Ex. 16 | E-2 | 25.6 | 7.0 | 7620 | 0*[1] |

*[1]Could not be detected by 1H-NMR

Production of Paper and Measurement of Properties

EXAMPLE 17

Recycled cardboard (containing 12% filler) was beaten to a Canadian Standard Freeness of 365 with a beater in diluting water having a hardness of 100 ppm and used in an amount such that the pulp concentration would be 2.4%. At 25° C., aluminum sulfate was added in an amount of 1.0% for the pulp (based on absolute dry weight), then the (meth)acrylamide polymer (A-1) manufactured in Example 1 was added in an amount of 0.4% for the pulp (based on absolute dry weight), then a weakly acidic rosin emulsion sizing agent (AL170 made by Japan PMC) was added in an amount of 0.2% for the pulp (based on absolute dry weight), with these additions made at intervals of 1 minute. This pulp slurry was diluted to 0.8% with 25° C. diluting water having a pH of 6.0 and a conductivity of 1500×10$^{-4}$ S/m, after which wet paper was obtained with a sheet machine made by Noble and Wood. This wet paper was pressed and then dried for 80 seconds at 100° C. with a drum dryer to obtain handmade paper with a basis weight of 80 g/m$^2$. The moisture of the paper thus obtained was adjusted for 24 hours at 23° C. and a RH of 50%, after which various measurements were made. The measurement results are given in Table 12.

COMPARATIVE EXAMPLE 12

Other than using the (meth)acrylamide polymer (a-3) manufactured in Comparative Example 3 instead of the (meth)acrylamide polymer (A-1), paper was made by hand in the same manner as in Example 17. The moisture of the paper thus obtained was adjusted for 24 hours at 23° C. and a RH of 50%, after which various measurements were made. The measurement results are given in Table 12.

COMPARATIVE EXAMPLE 13

Other than not using a (meth)acrylamide polymer, paper was made by hand in the same manner as in Example 17. The moisture of the paper thus obtained was adjusted for 24 hours at 23° C. and a RH of 50%, after which various measurements were made. The measurement results are given in Table 12.

TABLE 12

| | Acrylamide polymer | Burst Factor | Internal bond strength (mJ) | Ash content (%) | Stoeckigt sizing degree (sec) |
|---|---|---|---|---|---|
| Ex. 17 | A-1 | 3.13 | 289 | 7.41 | 12.0 |
| Comp. Ex. 12 | a-3 | 3.04 | 266 | 7.36 | 10.8 |
| Comp. Ex. 13 | — | 2.58 | 203 | 7.16 | 0.8 |

EXAMPLE 18

Recycled cardboard (containing 12% filler) was beaten to a Canadian Standard Freeness of 355 with a beater in diluting water having a hardness of 100 ppm and used in an amount such that the pulp concentration would be 2.4%. At 25° C., aluminum sulfate was added in an amount of 3.0% for the pulp (based on absolute dry weight), then the (meth)acrylamide polymer (B-1) manufactured in Example 2 was added in an amount of 0.4% for the pulp (based on absolute dry weight), then a weakly acidic rosin emulsion sizing agent (AL174 made by Japan PMC) was added in an amount of 0.2% for the pulp (based on absolute dry weight), with these additions made 1 minute apart. This pulp slurry was diluted to 0.8% with 25° C. diluting water having a pH of 5.5 and a conductivity of 1500×10$^{-4}$ S/m, after which wet paper was obtained with a sheet machine made by Noble and Wood. This wet paper was pressed and then dried for 80 seconds at 100° C. with a drum dryer to obtain handmade paper with a basis weight of 80 g/m$^2$. The moisture of the paper thus obtained was adjusted for 24 hours at 23° C. and a RH of 50%, after which various measurements were made. The measurement results are given in Table 13.

COMPARATIVE EXAMPLES 14 AND 15

Other than using the (meth)acrylamide polymer (b-4) or (b-5) manufactured in Comparative Example 7 or 8 instead of the (meth)acrylamide polymer (B-1), paper was made by hand in the same manner as in Example 18. The moisture of the paper thus obtained was adjusted for 24 hours at 23° C. and a RH of 50%, after which various measurements were made. The measurement results are given in Table 13.

COMPARATIVE EXAMPLE 16

Other than not using a (meth)acrylamide polymer, paper was made by hand in the same manner as in Example 18. The moisture of the paper thus obtained was adjusted for 24 hours at 23° C. and a RH of 50%, after which various measurements were made. The measurement results are given in Table 13.

TABLE 13

| | Acrylamide polymer | Burst Factor | Internal bond strength (mJ) | Ash content (%) | DDT (sec) | Stoeckigt sizing degree (sec) |
|---|---|---|---|---|---|---|
| Ex. 18 | B-1 | 3.09 | 299 | 7.78 | 50 | 24.4 |
| Comp. Ex. 14 | b-4 | 2.93 | 268 | 7.54 | 80 | 19.3 |
| Comp. Ex. 15 | b-5 | 3.05 | 296 | 7.71 | 53 | 20.7 |
| Comp. Ex. 16 | — | 2.47 | 193 | 7.39 | 68 | 6.1 |

EXAMPLE 19

Recycled cardboard (containing 12% filler) was beaten to a Canadian Standard Freeness of 358 with a beater in diluting water having a hardness of 100 ppm and used in an amount such that the pulp concentration would be 2.4%. At 25° C., aluminum sulfate was added in an amount of 1.0% for the pulp (based on absolute dry weight), then the (meth)acrylamide polymer (C-1) manufactured in Example 3 was added in an amount of 0.4% for the pulp (based on absolute dry weight), then a weakly acidic rosin emulsion sizing agent (AL170 made by Japan PMC) was added in an amount of 0.2% for the pulp (based on absolute dry weight), with these additions made at intervals of 1 minute. This pulp slurry was diluted to 0.8% with 25° C. diluting water having a pH of 6.0 and a conductivity of $1500 \times 10^{-4}$ S/m, after which wet paper was obtained with a sheet machine made by Noble and Wood. This wet paper was pressed and then dried for 80 seconds at 100° C. with a drum dryer to obtain handmade paper with a basis weight of 80 g/m². The moisture of the paper thus obtained was adjusted for 24 hours at 23° C. and a RH of 50%, after which various measurements were made. The measurement results are given in Table 14.

EXAMPLES 20 TO 27

Other than using the various (meth)acrylamide polymers (C-2) to (C-9) manufactured in Examples 4 to 11 instead of the (meth)acrylamide polymer (C-1), paper was made by hand in the same manner as in Example 19. The moisture of the paper thus obtained was adjusted for 24 hours at 23° C. and a RH of 50%, after which various measurements were made. The measurement results are given in Table 14.

COMPARATIVE EXAMPLES 17 AND 18

Other than using the (meth)acrylamide polymers (b-4) or (c-1) manufactured in Comparative Examples 7 or 9 instead of the (meth)acrylamide polymer (C-1), paper was made by hand in the same manner as in Example 19. The moisture of the paper thus obtained was adjusted for 24 hours at 23° C. and a RH of 50%, after which various measurements were made. The measurement results are given in Table 14.

COMPARATIVE EXAMPLE 19

Other than not using a (meth)acrylamide polymer, paper was made by hand in the same manner as in Example 19. The moisture of the paper thus obtained was adjusted for 24 hours at 23° C. and a RH of 50%, after which various measurements were made. The measurement results are given in Table 14.

TABLE 14

| | Acrylamide polymer | Burst Factor | Internal bond strength (mJ) | Ash content (%) | Stoeckigt sizing degree (sec) |
|---|---|---|---|---|---|
| Ex. 19 | C-1 | 3.16 | 303 | 7.37 | 10.3 |
| Ex. 20 | C-2 | 3.11 | 288 | 7.43 | 10.0 |
| Ex. 21 | C-3 | 3.11 | 289 | 7.36 | 10.6 |
| Ex. 22 | C-4 | 3.12 | 292 | 7.40 | 11.6 |
| Ex. 23 | C-5 | 3.11 | 288 | 7.50 | 12.8 |
| Ex. 24 | C-6 | 3.15 | 300 | 7.43 | 13.5 |
| Ex. 25 | C-7 | 3.17 | 295 | 7.50 | 13.7 |
| Ex. 26 | C-8 | 3.18 | 304 | 7.44 | 13.8 |
| Ex. 27 | C-9 | 3.17 | 301 | 7.50 | 14.5 |
| Comp. Ex. 17 | b-4 | 3.03 | 263 | 7.28 | 8.8 |
| Comp. Ex. 18 | c-1 | 3.11 | 285 | 7.34 | 7.9 |
| Comp. Ex. 19 | — | 2.60 | 207 | 7.14 | 1.1 |

EXAMPLES 28 AND 29

Recycled cardboard (containing 12% filler) was beaten to a Canadian Standard Freeness of 346 with a beater in diluting water having a hardness of 100 ppm and used in an amount such that the pulp concentration would be 2.4%. At 25° C., aluminum sulfate was added in an amount of 1.0% for the pulp (based on absolute dry weight), then the (meth)acrylamide polymer (C-10) or (C-11) manufactured in Example 12 or 13 was added in an amount of 0.4% for the pulp (based on absolute dry weight), then a weakly acidic rosin emulsion sizing agent (AL174 made by Japan PMC) was added in an amount of 0.2% for the pulp (based on absolute dry weight), with these additions made 1 minute apart. This pulp slurry was diluted to 0.8% with 25° C. diluting water having a pH of 6.0 and a conductivity of $1500 \times 10^{-4}$ S/m, after which wet paper was obtained with a sheet machine made by Noble and Wood. This wet paper was pressed and then dried for 80 seconds at 100° C. with a drum dryer to obtain handmade paper with a basis weight of 80 g/m². The moisture of the paper thus obtained was adjusted for 24 hours at 23° C. and a RH of 50%, after which various measurements were made. The measurement results are given in Table 15.

COMPARATIVE EXAMPLE 20

Other than using the (meth)acrylamide polymer (c-2) manufactured in Comparative Example 10 instead of the (meth)acrylamide polymer (C-10), paper was made by hand in the same manner as in Example 28. The moisture of the paper thus obtained was adjusted for 24 hours at 23° C. and a RH of 50%, after which various measurements were made. The measurement results are given in Table 15.

COMPARATIVE EXAMPLE 21

Other than not using a (meth)acrylamide polymer, paper was made by hand in the same manner as in Example 28. The moisture of the paper thus obtained was adjusted for 24 hours at 23° C. and a RH of 50%, after which various measurements were made. The measurement results are given in Table 15.

TABLE 15

|  | Acrylamide polymer | Burst Factor | Internal bond strength (mJ) | Ash content (%) | Stoeckigt sizing degree (sec) |
| --- | --- | --- | --- | --- | --- |
| Ex. 28 | C-10 | 3.20 | 304 | 7.79 | 27.4 |
| Ex. 29 | C-11 | 3.14 | 312 | 7.85 | 32.2 |
| Comp. Ex. 20 | c-2 | 3.08 | 299 | 7.80 | 23.5 |
| Comp. Ex. 21 | — | 2.58 | 210 | 7.16 | 1.0 |

EXAMPLE 30

BKP (a mixed pulp in which the hardwood to softwood pulp ratio was 9 to 1) was beaten to a Canadian Standard Freeness of 400 with a beater in diluting water having a hardness of 100 ppm and used in an amount such that the pulp concentration would be 2.5%, after which calcium carbonate (TP121S made by Okutama Kogyo) was added in an amount of 2.0% for the pulp (based on absolute dry weight), and talc (made by Nippon Talc) was added in an amount of 2.0% for the pulp (based on absolute dry weight). At 40° C., an amphoteric starch (Cato 3212 made by Oji National) was added to this pulp slurry in an amount of 0.6% for the pulp (based on absolute dry weight), then the (meth)acrylamide polymer (C-1) manufactured in Example 3 was added in an amount of 0.2% for the pulp (based on absolute dry weight), then aluminum sulfate was added in an amount of 1.5% for the pulp (based on absolute dry weight), and then a neutral rosin emulsion sizing agent (CC167 made by Japan PMC) was added in an amount of 0.4% for the pulp (based on absolute dry weight), with these additions made 1 minute apart. This pulp slurry was diluted to 0.5% with 40° C. diluting water having a pH of 7.5 and a conductivity of 1000×10$^{-4}$ S/m, after which calcium carbonate (TP121S made by Okutama Kogyo) was added to the diluted pulp slurry in an amount of 2.0% for the pulp (based on absolute dry weight), then talc (made by Nippon Talc) was added in an amount of 8.0% for the pulp (based on absolute dry weight), and then a retention aid (NR12MLS made by Hymo) was added in an amount of 0.01% for the pulp (based on absolute dry weight), after which wet paper was produced with a Noble and Wood paper machine. This wet paper was pressed and then dried for 80 seconds at 100° C. with a drum dryer to obtain handmade paper with a basis weight of 65 g/m². The moisture of the paper thus obtained was adjusted for 24 hours at 23° C. and a RH of 50%, after which various measurements were made. The measurement results are given in Table 16.

EXAMPLES 31 TO 38

Other than using the (meth)acrylamide polymers (C-2) to (C-9) manufactured in Examples 4 to 11 instead of the (meth) acrylamide polymer (C-1), paper was made by hand in the same manner as in Example 30. The moisture of the paper thus obtained was adjusted for 24 hours at 23° C. and a RH of 50%, after which various measurements were made. The measurement results are given in Table 16.

COMPARATIVE EXAMPLE 22

Other than using the (meth)acrylamide polymer (c-1) manufactured in Comparative Example 9 instead of the (meth)acrylamide polymer (C-1), paper was made by hand in the same manner as in Example 30. The moisture of the paper thus obtained was adjusted for 24 hours at 23° C. and a RH of 50%, after which various measurements were made. The measurement results are given in Table 16.

COMPARATIVE EXAMPLE 23

Other than not using a (meth)acrylamide polymer, paper was made by hand in the same manner as in Example 30. The moisture of the paper thus obtained was adjusted for 24 hours at 23° C. and a RH of 50%, after which various measurements were made. The measurement results are given in Table 16.

TABLE 16

|  | Acrylamide polymer | Burst Factor | Internal bond strength (mJ) | Ash content (%) | Stoeckigt sizing degree (sec) |
| --- | --- | --- | --- | --- | --- |
| Ex. 30 | C-1 | 2.83 | 218 | 9.01 | 17.1 |
| Ex. 31 | C-2 | 2.75 | 220 | 9.04 | 17.0 |
| Ex. 32 | C-3 | 2.73 | 218 | 9.14 | 18.6 |
| Ex. 33 | C-4 | 2.73 | 219 | 9.18 | 17.9 |
| Ex. 34 | C-5 | 2.83 | 219 | 9.22 | 19.6 |
| Ex. 35 | C-6 | 2.78 | 222 | 9.18 | 20.0 |
| Ex. 36 | C-7 | 2.75 | 220 | 9.19 | 20.6 |
| Ex. 37 | C-8 | 2.76 | 225 | 9.23 | 20.5 |
| Ex. 38 | C-9 | 2.73 | 226 | 9.24 | 21.1 |
| Comp. Ex. 22 | c-1 | 2.72 | 218 | 8.90 | 15.1 |
| Comp. Ex. 23 | — | 2.35 | 167 | 8.83 | 11.0 |

The above-mentioned measurements were conducted according to the following methods.

Burst Factor: according to JIS P 8112

Internal bond strength: according to Japan-TAPPI paper pulp test method No. 54

Ash content: according to JIS P 8128, other than changing the temperature to 550° C.

DDT: Using an apparatus the same as the dynamic drainage jar discussed on page 46 of TAPPI, Vol. 56, No. 10 (1973), 500 mL of diluted pulp slurry (0.8% concentration) was poured into a jar with a 7.5 cm diameter, the lower cock was opened while the contents were stirred at 600 rpm, the outflow was filtered through a metal screen of 100 mesh, and the time it took to reach a specific filtrate amount was measured. This result can be used to evaluate drainage. The time it took for the filtrate amount to reach 200 g was measured. The smaller the numerical value, the better the water drainage.

Stoeckigt sizing degree: according to JIS P 8122

EXAMPLE 39

Recycled cardboard (containing 12% filler) was beaten to a Canadian Standard Freeness of 260 with a beater in diluting water having a hardness of 100 ppm and used in an amount such that the pulp concentration would be 2.4%. At 25° C., aluminum sulfate was added in an amount of 3.0% for the pulp (based on absolute dry weight), and then an internally added paper strengthener (DS457 made by Japan PMC) was added in an amount of 0.5% for the pulp (based on absolute dry weight), after which this pulp slurry was diluted to 0.25% with 25° C. diluting water having a pH of 4.5, and two sheets of wet papper with a basis weight of 80 g/m² were produced with a Noble and Wood paper machine. One side of one sheet of wet paper was spray coated with a 0.40% (solids concentration) aqueous solution of the (meth)acrylamide polymer (D-1) manufactured in Example 14, such that the coating amount was 0.31 g/m², after which the other sheet of wet paper was laid over the coated side, and the paper was pressed and then dried for 80 seconds at 100° C. with a drum dryer to obtain handmade paper. The moisture of the paper thus obtained was adjusted for 24 hours at 23° C. and a RH of 50%, after which various measurements were made. The measurement results are given in Table 17. The plybond strength is indicated by the T-peel strength.

COMPARATIVE EXAMPLE 24

Other than using the (meth)acrylamide polymer (d-1) manufactured in Comparative Example 11 instead of the (meth)acrylamide polymer (D-1), and spray coating such that the coating amount was 0.33 g/m², paper was produced in the same manner as in Example 39. The moisture of the paper thus obtained was adjusted for 24 hours at 23° C. and a RH of 50%, after which various measurements were made. The measurement results are given in Table 17.

COMPARATIVE EXAMPLE 25

Other than using an ungelatinized slurry of interlaminar spray starch (Hi-Stard PSS-9 made by Sanwa Cornstarch) with a solids concentration of 1.2% instead of using the (meth)acrylamide polymer (D-1), and spray coating such that the coating amount was 1.03 g/m², paper was produced in the same manner as in Example 39. The moisture of the paper thus obtained was adjusted for 24 hours at 23° C. and a RH of 50%, after which various measurements were made. The measurement results are given in Table 17.

COMPARATIVE EXAMPLE 26

Other than not using the (meth)acrylamide polymer (D-1), paper was produced in the same manner as in Example 39. The moisture of the paper thus obtained was adjusted for 24 hours at 23° C. and a RH of 50%, after which various measurements were made. The measurement results are given in Table 17.

TABLE 17

| | Acrylamide polymer | Starch | Coating amount (g/m²) | T-peel strength (mN/m) | Dry Burst Factor |
|---|---|---|---|---|---|
| Ex. 39 | D-1 | — | 0.31 | 9.61 × 10⁴ | 2.90 |
| Comp. Ex. 24 | d-1 | — | 0.33 | 8.14 × 10⁴ | 2.86 |
| Comp. Ex. 25 | — | Interlaminar spray starch Hi-Stard PSS-9 | 1.03 | 7.26 × 10⁴ | 2.82 |
| Comp. Ex. 26 | — | — | — | 4.81 × 10⁴ | 2.73 |

The above measurements were conducted according to the following methods.

T-peel strength: according to Japan-TAPPI paper pulp test method No. 19-77

Internal bond strength: according to Japan-TAPPI paper pulp test method No. 54

EXAMPLE 40

A 3.0% aqueous solution of the (meth)acrylamide polymer (E-1) manufactured in Example 15 was applied by laboratory sizing press (roll nip pressure: 20 kg/cm, coating speed: 100 m/min) to both sides of neutral wood free paper (basis weight 100 g/m²), and this product was dried for 80 seconds at 100° C. with a drum dryer to obtain double-coated paper. The coating amount of the (meth)acrylamide polymer (E-1) was 0.54 g/m² (solids content). The moisture of the coated paper thus obtained was adjusted for 24 hours at 23° C. and a RH of 50%, after which various measurements were made. The measurement results are given in Table 18.

EXAMPLE 41

Other than using the (meth)acrylamide polymer (E-2) manufactured in Example 16 instead of the (meth)acrylamide polymer (E-1), coated paper was obtained in the same manner as in Example 40. The coating amount of the (meth)acrylamide polymer (E-2) was 0.51 g/m² (solids content). The moisture of the coated paper thus obtained was adjusted for 24 hours at 23° C. and a RH of 50%, after which various measurements were made. The measurement results are given in Table 18.

COMPARATIVE EXAMPLE 27

Other than using oxidized starch (MS-3800 made by Nihon Shokuhin Kako) with a concentration of 6.0% instead of using the (meth)acrylamide polymer (E-1), coated paper was obtained in the same manner as in Example 40. The coating amount of the oxidized starch was 1.02 g/m². The moisture of the coated paper thus obtained was adjusted for moisture for 24 hours at 23° C. and a RH of 50%, after which various measurements were made. The measurement results are given in Table 18.

COMPARATIVE EXAMPLE 28

Other than coating with water instead of using the (meth)acrylamide polymer (E-1), coated paper was obtained in the same manner as in Example 40. The moisture of the coated paper thus obtained was adjusted for 24 hours at 23° C. and a RH of 50%, after which various measurements were made. The measurement results are given in Table 18.

TABLE 18

| | Acrylamide polymer | Starch | Coating amount (g/m²) | Internal bond strength (mJ) | Dry pick | Wet pick |
|---|---|---|---|---|---|---|
| Ex. 40 | E-1 | — | 0.54 | 516 | 5 | 5 |
| Ex. 41 | E-2 | — | 0.51 | 508 | 5 | 5 |
| Comp. Ex. 27 | — | oxidized starch MS-3800 | 1.02 | 429 | 3 | 3 |
| Comp. Ex. 28 | — | — | — | 294 | 1 | 1 |

The above measurements were conducted according to the following methods.

Internal bond strength: according to Japan-TAPPI paper pulp test method No. 54

Dry pick: RI printing tester, 10 mm nip width; ink: fine ink (for IGT printing applications, made by Dainippon Ink & Chemicals), T.V. of ink: 24

Wet pick: RI printing tester, using Morton roll, 10 mm nip width; ink: CAPS G. (for offset applications, made by Dainippon Ink & Chemicals), T.V. of ink: 12

In every case, paper peeling after printing was examined visually, and a grade from 1 to 5 was assigned, with 5 being best.

The manufacturing results (Tables 2 to 11) for the above examples and comparative examples tell us that when a (meth)acrylamide polymer is manufactured using a cationic compound expressed by general formula 1:

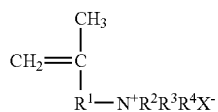

general formula 1 (1)

(where $R^1$ is a $C_1$ to $C_4$ alkylene group, $R^2$ to $R^4$ are each a hydrogen atom or $C_{22}$ or lower alkyl group that may have a substituent (two or three of $R^2$ to $R^4$ may not be hydrogen atoms), and $X^-$ is an anion of an inorganic acid or an organic acid), this polymer will have low viscosity and excellent dispersibility and fluidity, just as when using hypophosphorous acid, 2-methyl-2-propene-1-sulfonic acid (salt) (that is, methallylsulfonic acid (salt)), or another such conventional compound having the function of lowering the viscosity of a polymer. On the other hand, when 2-methyl-2-propen-1-ol (that is, methallyl alcohol), sodium 2-propene-1-sulfonate (that is, sodium allylsulfonate), or 2-propenylamine (that is, allylamine) was used, which are all known as compounds having the function of lowering the viscosity of a polymer, the polymer gelled and could not be manufactured under the polymerization conditions and compositions given in Tables 2 and 4. Also, when a compound expressed by the above-mentioned general formula 1 is used, just as when using hypophosphorous acid, 2-methyl-2-propene-1-sulfonic acid (salt), or another such conventional compound having the function of lowering the viscosity of a polymer, it is possible to manufacture a (meth)acrylamide polymer containing extremely little unreacted monomer (2-propenamide (that is, acrylamide)). This indicates that a compound expressed by the above-mentioned general formula 1 is a cationic compound having a novel function of lowering polymer viscosity.

The results (Tables 12 to 17) for the examples in which the (meth)acrylamide polymers manufactured in the examples were used as papermaking chemicals, and those of the comparative examples, tell us that when a compound expressed by the above-mentioned general formula 1 is used, a paper strengthening effect is obtained that is equal to or better than that when using hypophosphorous acid, 2-methyl-2-propene-1-sulfonic acid (salt) (that is, methallylsulfonic acid (salt)), or another such conventional compound having the function of lowering the viscosity of a polymer, and the sizing degree is superior to that obtained up to now.

The results (Tables 14 and 16) for the examples in which the (meth)acrylamide polymers (C-1) to (C-9) manufactured in the examples were used tell us that the sizing degree is especially good when (meth)acrylamide polymers (C-7) to (C-9) are used. Specifically, this indicates that it is preferable for hydroxyethyl groups to be introduced into the structure of $R^2$ to $R^4$ in the above-mentioned general formula 1.

It can be seen from the results (Table 15) for the examples in which the (meth)acrylamide polymers (C-10) and (C-11) manufactured in the examples were used that the sizing degree is especially good when (C-11). Specifically, this indicates that it is preferable, in terms of increasing the sizing degree, for sodium 2-methyl-2-propene-1-sulfonate (that is, sodium methallylsulfonate) to be used along with [the compound of] the above-mentioned general formula 1.

INDUSTRIAL APPLICABILITY

The present invention provides a (meth)acrylamide polymer that has low viscosity and good dispersibility and fluidity, which is accomplished by using a cationic monomer having the function of lowering the viscosity of a polymer. When a (meth)acrylamide polymer manufactured according to the present invention is used as a papermaking chemical, it provides a paper strengthening effect and an increase in the sizing degree that are equal to or better than those achieved with a (meth)acrylamide polymer manufactured using a conventional compound having the function of lowering the viscosity of a polymer. Also, the (meth)acrylamide polymer manufactured according to the present invention can be added internally, used as an interlaminar spray, or applied by coating, and can therefore be used as a papermaking chemical in a wide range of applications.

The invention claimed is:

1. A papermaking chemical, containing a (meth)acrylamide polymer produced by polymerizing a monomer (a) expressed by the following general formula 1, the following monomer (b), the following monomer (c1), the following monomer (c2), and a crosslinking agent (d):

(a) general formula 1:

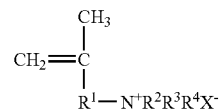

(1)

where $R^1$ is a $C_1$ to $C_4$ alkylene group, $R^2$ to $R^4$ are each independently selected from the group consisting of a hydrogen atom a $C_{22}$ or lower alkyl group a $C_{22}$ or lower hydroxyalkyl group, a $C_{22}$ or lower alkylamine group, a $C_{22}$ or lower alkyl ether group, a $C_{22}$ or lower alkyl ester group, a $C_{22}$ or lower alkylamide group, a $C_{22}$ or lower aryl group, or a group that has a cyclic structure when any two of $R^2$ or $R^4$ bond together, and X— is an anion of an inorganic acid or an organic acid);

(b) a (meth)acrylamide;

(c1) a (meth)allylsulfonic acid (salt);

(c2) an ionic monomer other than the monomer (a) and the monomer (c1).

2. A method for manufacturing a papermaking chemical containing a (meth)acrylamide polymer, which comprises polymerizing a monomer (a) represented by formula (1):

the monomer (a) is represented by formula 1:

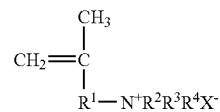

(1)

where $R^1$ is a $C_1$ to $C_4$ alkylene group, $R^2$ to $R^4$ are each independently selected from the group consisting of a hydrogen atom a $C_{22}$ or lower alkyl group a $C_{22}$ or lower hydroxyalkyl group, a $C_{22}$ or lower alkylamine group, a $C_{22}$ or lower alkyl ether group, a $C_{22}$ or lower alkyl ester group, a $C_{22}$ or lower alkylamide group, a $C_{22}$ or lower aryl group, or a group that has a cyclic structure when any two of $R^2$ or $R^4$ bond together, and X— is an inorganic acid or an anion of an organic acid);

a (meth)acrylamide, as monomer (b);

a (meth)allylsulfonic acid (salt), as monomer (c1);

an ionic monomer other than the monomer (a) and the monomer (c1), as monomer (c2); and a cross linking agent (d).

3. The method for manufacturing the papermaking chemical containing a (meth)acrylamide polymer according to claim 2, wherein at least one member is selected from the group consisting of the monomer (a), the monomer (b), the monomer (c1), the monomer (c2) and the crosslinking agent (d) is polymerized, and the remaining monomers and/or the crosslinking agent are adding during this polymerization.

4. The papermaking chemical containing a (meth)acrylamide polymer according to claim 1, wherein the polymerization is conducted in the presence of at least one urea compound selected from the group consisting of urea, thiourea, ethylurea, ethylenethiourea, phosphates of guanidyl urea, and sulfates of guanidyl urea.

5. The method for manufacturing a papermaking chemical containing a polymer according to claim 3, wherein the polymerization is conducted in the presence of at least one urea compound selected from the group consisting of urea, thiourea, ethylurea, ethyleneurea, ethylenethiourea, phosphates of guanidyl urea, and sulfates of guanidyl urea.

6. The papermaking chemical, wherein the papermaking chemical containing a (meth)acrylamide polymer according to claim 1 is a paper strength agent.

7. A method of reducing viscosity of polymers used in papermaking, which comprises polymerizing a monomer (a) expressed by formula 1, with the following monomer (b), the following monomer (ci), the following monomer (c2), and a crosslinking agent (d):

(a) formula 1

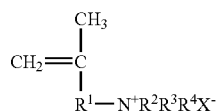

where $R^1$ is a $C_1$ to $C_4$ alkylene group, $R^2$ to $R^4$ are each group independently selected from the group consisting of a hydrogen atom a $C_{22}$ or lower alkyl group a $C_{22}$ or lower hydroxyalkyl group, a $C_{22}$ or lower alkylamine group, a $C_{22}$ or lower alkyl ether group, a $C_{22}$ or lower alkyl ester group, a $C_{22}$ or lower alkylamide group, a $C_{22}$ or lower aryl group, or a group that has a cyclic structure when any two of $R^2$ to $R^4$ bond together, and X⁻ is an inorganic acid or an anion of an organic acid);

(b) a (meth)acrylamide;

(c1) a (meth)allylsulfonic acid (salt);

(c2) an ionic monomer other than the monomer (a) and the monomer (c1), thereby producing a (meth)acrylamide polymer.

8. The method according to claim 7, wherein at least one member selected from the group consisting of the monomer (a), the monomer (b), the monomer (c1), the monomer (c2), and the crosslihking agent (d) is polymerized, and the remaining monomers and/or the crosslinking agent are added during this polymerization.

9. The method of reducing viscosity of polymers used in papermaking according to claim 7, wherein the polymerization is carried out in the presence of at least one urea compound selected from the group consisting of urea, thiourea, ethyleneurea, ethvlenethiourea, phosphates of guanidyl urea, and sulfates of guanidyl urea.

10. The method of reducing viscosity of polymers used in papermaking according to claim 8, wherein the polymerization is carried out in the presence of at least one urea compound selected from the group consisting of urea, thiourea, ethyleneurea, ethylenethiourea, phosphates of guanidyl urea, and sulfates of guanidyl urea.

11. A method of increasing paper strength, which comprises adding to a pulp slurry a papermaking chemical containing a (meth)acrylamide polymer produced by polymerizing a monomer (a) expressed by general formula 1, the following monomer (b), the following monomer (c1), the following monomer (c2), and a crosslinking agent (d):

(a) general formula 1

where R1 is a $C_1$ to $C_4$ alkylene group, $R^2$ to $R^4$ are each independently selected from the group consisting of a hydrogen atom a $C_{22}$ or lower alkyl group a $C_{22}$ or lower hydroxyalkyl group, a $C_{22}$ or lower alkylamine group, a $C_{22}$ or lower alkyl ether group, a $C_{22}$ or lower alkyl ester group, a $C_{22}$ or lower alkylamide group, a $C_{22}$ or lower aryl group, or a group that has a cyclic structure when any two of $R^2$ to $R^4$ bond together, and X⁻ is an inorganic acid or an anion of an organic acid);

(b) a (meth)acrylamide;

(c1) a (ineth)allylsulfonic acid (salt);

(c2) an ionic monomer other than the monomer (a) and the monomer (c1).

12. The method according to claim 11, wherein at least one member selected from the group consisting of the monomer (a), the monomer (b), the monomer (c1), the monomer (c2), and the crosslinking agent (d) is polymerized, and the remaining monomers and/or the crosslinking agent are added during this polymerization.

13. The method according to claim 11, wherein the polymerization is carried out in the presence of at least one urea compound selected from the group consisting of urea, thiourea, ethyleneurea, ethylenethiourea, phosphates of guanidyl urea, and sulfates of guanidyl urea.

14. The method according to claim 12, wherein the polymerization is carried out in the presence of at least one urea compound selected from the group consisting of urea, thiourea, ethyleneurea, ethylenethiourea, phosphates of guanidyl urea, and sulfates of auanidyl urea.

* * * * *

UNITED STATES PATENT AND TRADEMARK OFFICE
CERTIFICATE OF CORRECTION

PATENT NO. : 7,482,417 B2
APPLICATION NO. : 10/505346
DATED : January 27, 2009
INVENTOR(S) : Kiyosada et al.

It is certified that error appears in the above-identified patent and that said Letters Patent is hereby corrected as shown below:

<u>Column 1</u>, Line 17, "papermeaking" should read -- papermaking --

<u>Column 40</u>, Claim 1, line 49, "$R^2$ or $R^4$" should read -- $R^2$ to $R^4$ --

<u>Column 40</u>, Claim 1, line 50, "acid);" should read -- acid; --

<u>Column 41</u>, line 8 of Claim 2, "$R^2$ or $R^4$" should read -- $R^2$ to $R^4$ --

<u>Column 41</u>, line 9 of Claim 2, "acid);" should read -- acid; --

<u>Column 41</u>, line 21 of Claim 3, "are adding" should read -- are added --

<u>Column 41</u>, line 26 of Claim 4, "ethylurea" should read -- ethyleneurea --

<u>Column 41</u>, lines 31-32 of Claim 5, "thiourea, ethylurea, ethleneurea" should read -- thiourea, ethyleneurea --

<u>Column 41</u>, line 40 of Claim 7, "monomer (ci)" should read -- monomer (c1) --

<u>Column 41</u>, line 52 of Claim 7, "each group independently" should read -- each independently --

<u>Column 41</u>, line 59 of Claim 7, "and $X^-$ is an inorganic acid or an anion of an organic acid);" should read -- and $X^-$ is an anion of an inorganic acid or an organic acid; --

UNITED STATES PATENT AND TRADEMARK OFFICE
CERTIFICATE OF CORRECTION

PATENT NO. : 7,482,417 B2
APPLICATION NO. : 10/505346
DATED : January 27, 2009
INVENTOR(S) : Kiyosada et al.

It is certified that error appears in the above-identified patent and that said Letters Patent is hereby corrected as shown below:

Column 42, line 11 of Claim 9, "ethvlenethiourea" should read -- ethylenethiourea --

Column 42, lines 41 and 42 of Claim 11, "and $X^-$ is an inorganic acid or an anion of an organic acid);" should read -- and $X^-$ is an anion of an inorganic acid or an organic acid; --

Column 42, line 44 of Claim 11, "(ineth)" should read -- (meth) --

Column 42, line 62 of Claim 14, "auanidyl urea" should read -- guanidyl urea --

Signed and Sealed this

Second Day of June, 2009

JOHN DOLL
*Acting Director of the United States Patent and Trademark Office*